United States Patent
Chiou et al.

(10) Patent No.: US 12,491,146 B1
(45) Date of Patent: Dec. 9, 2025

(54) SKIN BRIGHTENING COMPOSITIONS WITH THIOPYRIDINONE COMPOUND

(71) Applicant: L'OREAL, Paris (FR)

(72) Inventors: Catherine Chiou, Saddle Brook, NJ (US); Hungta Lin, Teaneck, NJ (US); Mariko Hasebe, New York, NY (US); Nicholas David Stebbins, Clark, NJ (US); Ritesh Kumar Sinha, Linden, NJ (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 19/045,297

(22) Filed: Feb. 4, 2025

Related U.S. Application Data

(60) Provisional application No. 63/737,499, filed on Dec. 20, 2024.

(51) Int. Cl.
*A61K 8/49* (2006.01)
*A61K 8/34* (2006.01)
*A61K 8/46* (2006.01)
*A61Q 19/02* (2006.01)

(52) U.S. Cl.
CPC ............ *A61K 8/4933* (2013.01); *A61K 8/345* (2013.01); *A61K 8/463* (2013.01); *A61Q 19/02* (2013.01); *A61K 2800/28* (2013.01); *A61K 2800/5424* (2013.01)

(58) Field of Classification Search
CPC ...... A61Q 19/02; A61K 8/4933; A61K 8/345; A61K 8/463; A61K 2800/28; A61K 2800/5424
See application file for complete search history.

(56) References Cited

U.S. PATENT DOCUMENTS

| | | |
|---|---|---|
| 5,888,489 A | 3/1999 | von Mallek |
| 7,744,655 B2 | 6/2010 | De Boni et al. |
| 8,450,260 B2 | 5/2013 | Crawford et al. |
| 9,138,392 B2 | 9/2015 | Marat |
| 9,248,083 B2 | 2/2016 | Aires et al. |
| 9,408,785 B2 | 8/2016 | Pistorio et al. |
| 10,328,009 B1 | 6/2019 | Elsen-Wahrer et al. |
| 10,548,832 B2 | 2/2020 | Thomas et al. |
| 10,561,592 B2 | 2/2020 | Darras et al. |
| 10,912,728 B2 | 2/2021 | D'Arras et al. |
| 11,458,084 B2 | 10/2022 | Park et al. |
| 2002/0176843 A1 | 11/2002 | Creton |
| 2002/0182238 A1 | 12/2002 | Creton |
| 2005/0158269 A1 | 7/2005 | Simonet |
| 2005/0222001 A1 | 10/2005 | Baumeister et al. |
| 2007/0128256 A1 | 6/2007 | Aubrun-Sonneville |
| 2008/0014162 A1 | 1/2008 | Willemin et al. |
| 2011/0171151 A1 | 7/2011 | Arnaud et al. |
| 2013/0011360 A1 | 1/2013 | Viravau et al. |
| 2013/0210696 A1 | 8/2013 | Vethamuthu et al. |
| 2015/0297481 A1 | 10/2015 | Wahler et al. |
| 2015/0359722 A1 | 12/2015 | Thomas et al. |
| 2017/0113071 A1* | 4/2017 | Schoepgens ......... A61K 8/4973 |
| 2017/0189286 A1 | 7/2017 | George et al. |
| 2017/0326044 A1 | 11/2017 | Springinsfeld et al. |
| 2019/0060196 A1 | 2/2019 | Elsen et al. |
| 2019/0216692 A1 | 7/2019 | Luan et al. |
| 2019/0290557 A1 | 9/2019 | Shimizu et al. |
| 2020/0188282 A1 | 6/2020 | Chodorowski-Kimmes |
| 2020/0188283 A1 | 6/2020 | Chodorowski-Kimmes |
| 2022/0362128 A1 | 11/2022 | Hamazaki et al. |
| 2022/0378683 A1 | 12/2022 | Stebbins et al. |

FOREIGN PATENT DOCUMENTS

| | | |
|---|---|---|
| CN | 116549324 A | 8/2023 |
| EP | 2811972 B1 | 2/2016 |
| FR | 3136667 A1 | 12/2023 |
| FR | 3138036 A1 | 1/2024 |
| FR | 3138310 A1 | 2/2024 |
| FR | 3143036 A1 | 6/2024 |
| WO | 2023249121 A1 | 12/2023 |
| WO | 2023249122 A1 | 12/2023 |

\* cited by examiner

*Primary Examiner* — Marianne C Seidel
*Assistant Examiner* — Amanda Michelle Petritsch
(74) *Attorney, Agent, or Firm* — POLSINELLI PC

(57) ABSTRACT

A cosmetic composition comprising: (a) 2-mercaptonicotinoyl glycine; (b) acyl glycinate surfactant; (c) a salt providing divalent cations having a charge density of about 40 to about 200 C/mm$^3$ and a water solubility of at least 400 g/L; (d) anionic polymer; (e) glycerin; (f) water; and (g) reducing agent. The cosmetic composition is particularly useful in a method for brightening skin, depigmenting skin, treating hyperpigmentation of skin, treating melasmic skin, or evening skin tone.

20 Claims, No Drawings

SKIN BRIGHTENING COMPOSITIONS WITH THIOPYRIDINONE COMPOUND

CROSS-REFERENCE TO RELATED APPLICATIONS

This application claims the benefit under 35 U.S.C. § 119(e) of the filing date of U.S. Provisional Patent Application No. 63/737,499, filed on Dec. 20, 2024, entitled "SKIN BRIGHTENING COMPOSITIONS WITH THIOPYRIDINONE COMPOUND," the entirety of which is herein incorporated by reference.

FIELD OF THE DISCLOSURE

The present disclosure relates to cosmetic compositions formulated with 2-mercaptonicotinoyl glycine, and to methods for treating skin with the compositions.

BACKGROUND

The pursuit of radiant, even-toned skin has become a universal desire, driving the widespread demand for skin-brightening products. These products address common skin concerns such as hyperpigmentation, dark spots, blemishes, and uneven tone. In regions like Asia and Africa, where skin lightening is often viewed as a hallmark of enhanced beauty, the popularity of these products continues to grow. However, the complexity of skin pigmentation and the limitations of existing technologies emphasize the need for innovative solutions that are both safe and effective.

Skin pigmentation is governed by the intricate process of melanogenesis, which involves the production, transport, and distribution of melanin, the pigment responsible for skin color. This process relies on multiple biological factors, with tyrosinase—a key enzyme in the conversion of tyrosine to melanin—playing a critical role. Controlling pigmentation often focuses on inhibiting tyrosinase, but melanogenesis is influenced by a network of gene pathways, making it challenging to regulate with precision.

Various active ingredients are used in skin-brightening products to reduce pigmentation and promote an even complexion. Niacinamide, a form of Vitamin B3, is widely recognized for its effectiveness and safety in addressing these concerns while enhancing overall skin radiance. However, its use is not without drawbacks, as it can sometimes cause flushing, tingling, or redness. Other ingredients, such as kojic acid, arbutin, and hydroquinone, are effective inhibitors of tyrosinase but often come with issues like toxicity or limited efficacy in real-world applications. Alpha hydroxy acids, valued for their exfoliating properties, are another common option, yet they may increase sensitivity to environmental factors. Traditional formulations frequently rely on alkaline boosters like aqueous ammonia or persulfate to activate oxidizing agents, but these boosters are associated with unpleasant odors, skin irritation, and instability due to their volatile nature. These limitations reduce their overall effectiveness and appeal to consumers.

Modern consumers seek more than just solutions for pigmentation; they desire products that provide a holistic approach to skin health, offering glow, radiance, and long-term benefits. While research into pigmentation has advanced significantly, many current products fail to meet these expectations comprehensively, leaving room for innovation in the field. Skin brightening technology continues to evolve. The path forward lies in developing solutions that provide visible and lasting improvements in skin appearance, remain gentle and non-irritating, and are accessible to a diverse range of consumers.

SUMMARY OF THE DISCLOSURE

The instant case relates to a cosmetic composition for skin containing 2-mercaptonicotinoyl glycine, designed to provide a skin-brightening effect for users. The formulation leverages a physical lamellar structure, supported by divalent cations (e.g., $Mg^{2+}$), to stabilize the composition and enhance penetration of active agents into the stratum corneum. These features ensure the effective delivery of the 2-mercaptonicotinoyl glycine to the skin while maintaining its potency. The composition is versatile and can be used in at least three ways: as a daily cleanser, a facial mask, or a spot treatment. To enhance skin benefits, the composition incorporates organic acids, including AHAs and BHAs, which provide gentle exfoliation by promoting skin peeling. This exfoliating effect complements the inclusion of niacinamide and 2-mercaptonicotinoyl glycine, both of which are well-regarded in dermatology for their ability to reduce hyperpigmented spots and even out skin tone. Niacinamide is also useful for treating gingival melanin hyperpigmentation.

The cosmetic composition includes:
  (a) 2-mercaptonicotinoyl glycine;
  (b) one or more acyl glycinate surfactants;
  (c) one or more salts providing divalent cations having a charge density of about 40 to about 200 $C/mm^3$ and a water solubility of at least 400 g/L;
  (d) one or more anionic polymers;
  (e) glycerin;
  (f) water; and
  (g) one or more reducing agents.

2-Mercaptonicotinoyl glycine provide antioxidant and anti-aging properties to the composition. It is formed by combination of nicotinic acid (a form of Vitamin B3) and glycine (an amino acid) with a sulfur-containing thiol group, which contributes to its bioactivity. This unique structure gives it several benefits in the cosmetic application. The thiol (—SH) group in 2-mercaptonicotinoyl glycine acts as a potent antioxidant, scavenging free radicals and protecting the skin from oxidative stress caused by environmental factors such as UV radiation and pollution. The thiol group also has the ability to chelate metal ions, which can help reduce oxidative stress caused by metal-catalyzed reactions in the skin. As a derivative of nicotinic acid, it helps improve skin tone by reducing the appearance of dark spots and pigmentation, contributing to a more even complexion. By combating free radicals and oxidative damage, 2-mercaptonicotinoyl glycine supports collagen preservation and helps reduce the visible signs of aging, such as fine lines and wrinkles.

Acyl glycinate surfactants are a type of anionic surfactant that contribute to the cleansing ability of the cosmetic composition. Nonlimiting examples of acyl glycinate surfactants include cocoyl glycinate, sodium lauroyl glycinate, sodium myristoyl glycinate, potassium lauroyl glycinate, potassium cocoyl glycinate, or a combination thereof.

Nonlimiting examples of salts providing a divalent cation include magnesium salts, calcium salts, and combinations thereof. More specific but nonlimiting examples of salts providing a divalent cation include magnesium chloride, calcium chloride, magnesium sulfate, magnesium thiosulfate, calcium sulfate, calcium thiosulfate, magnesium pyrrolidone carboxylate (magnesium pidolate), zinc sulfate, calcium pyrrolidone carboxylate (calcium pidolate), magnesium gluconate, and combinations thereof.

The cosmetic composition includes one or more anionic polymers. An anionic polymer is a type of polymer that carries a negative charge (anionic) and is used to increase the viscosity or thickness of a composition. These polymers work by interacting with water or other ingredients in the formulation to form a gel-like structure, which helps the product achieve the desired thickness or consistency. The Anionic polymers are particularly effective in suspending other ingredients, improving the texture of a product, and enhancing its spreadability on the skin or hair. Nonlimiting examples of anionic polymers include copolymers of two or more monomers selected from acrylic acid, methacrylic acid, vinyl monomers, and (meth)acrylamide. A particularly useful anionic polymer is acrylates copolymer.

Glycerin, also known as glycerol, is a colorless, odorless, and viscous liquid. It is a naturally occurring compound derived from plant oils or animal fats and has the ability to attract and retain moisture.

The cosmetic composition includes one or more reducing agents, especially sulfur-containing reducing agents. Nonlimiting examples include alkaline-earth metal sulfites, sulfites, thiol-based compounds, salts thereof, or combinations thereof. Nonlimiting examples of thiol-based compounds include thiolactic acid, glycerol monothiolactate, ammonium thiolactate, MEA-thiolactate, 3-mercaptopropionic acid, glycerol 3-mercaptopropionate, ethyleneglycol 3-mercaptopropionate, cysteamine, N-acetylcysteamine, N-propionylcysteamine, cysteine, N-acetylcysteine, N-alkanoylcysteine, cysteine alkyl esters, homocysteine, thioglycolic acid, ethanolamine thioglycolate, glyceryl thioglycolate, glutathione, thioglycerol, thiomalic acid, thiodiglycol, 2-mercaptoethanol, dithiothreitol, thioxanthine, thiosalicylic acid, thiopropionic acid, lipoic acid, and combinations thereof. Additional examples of useful reducing agents include ammonium thioglycolate, L-cysteine, N-acetyl L-cysteine, glutathione, ascorbic acid, beta-mercaptoethanol, 2-mercaptoethylamine, 2-mercaptoethylamine hydrochloride, dithiothreitol (DTT), thiolactic acid, thiosalicylic acid, tris-2-carboxyethylphospine hydrochloride (TCEP), sodium hydrosulfite, sodium thiosulfate, potassium disulfite, sodium disulfite, sodium bisulfate, sodium bisulfite, ammonium bisulfite, calcium thioglycolate, potassium thioglycolate, sodium thioglycolate, cysteine hydrochloride, thioglycerin, mercaptopropionic acid, glycerol thioglycolate, and dithiolbutylamine (DTBA), or combinations thereof.

The cosmetic composition may also include one or more fatty compounds. Nonlimiting examples of fatty compounds include fatty alcohols, fatty acid, fatty esters, oils, waxes, or combinations thereof.

The cosmetic composition also optionally includes one or more skin active agents, in addition to the 2-mercaptonicotinoyl glycine, for example, photoprotective agents, self-tanning agents, desquamating agents, depigmenting agents, moisturizing agents, skin lightening agents, anti-aging ingredients, anti-wrinkle agents, antioxidants, and mixtures thereof. Preferably, the cosmetic composition includes one or more skin active agents are selected from niacinamide, alpha hydroxy acids, beta hydroxy acids, polyhydroxy acids, or combinations thereof.

The cosmetic composition preferably includes one or more humectants. Humectants are ingredients that attract and retain moisture from the environment, drawing water into the skin and helping to keep it hydrated. These substances play a crucial role in maintaining the skin's moisture balance, preventing dryness, and enhancing the skin's softness and smoothness. Nonlimiting examples of humectants include polyols having from 1 to 8 carbon atoms.

The cosmetic compositions are particularly useful in methods for brightening skin. For example, the cosmetic compositions are employed in methods for brightening skin, depigmenting skin, treating hyperpigmentation of skin, treating melasmic skin, evening skin tone, treating or preventing acne, or a combination thereof. The methods typically include applying an effective amount of the cosmetic composition to skin in need thereof.

DETAILED DESCRIPTION OF THE DISCLOSURE

The cosmetic composition of the present disclosure contains 2-mercaptonicotinoyl glycine. It provides a skin-brightening effect for users and can be used as a cleanser, a facial mask, or a spot treatment, depending on the needs of the consumer. The formulation has a physical lamellar structure that stabilizes the 2-mercaptonicotinoyl glycine and enhances its penetration through the stratum corneum. These features ensure the effective delivery of 2-mercaptonicotinoyl glycine to the skin while maintaining its potency. Thus, an objective of the present invention is to provide a composition for treating, hydrating and cleansing acne-prone skin, while simultaneously brightening the skin and treating/preventing acne.

The cosmetic composition typically includes:
(a) 2-mercaptonicotinoyl glycine;
(b) one or more acyl glycinate surfactants;
(c) one or more salts providing divalent cations having a charge density of about 40 to about 200 $C/mm^3$ and a water solubility of at least 400 g/L;
(d) one or more anionic polymers;
(e) glycerin;
(f) water; and
(g) one or more reducing agents;
wherein all percentages by weight are based on the total weight of the composition.

The composition typically has a lamellar liquid crystal structure. A lamellar liquid crystal structure is an organized arrangement of molecules that form layered, sheet-like structures. In this structure, the molecules align themselves in a regular, repeating pattern, with each layer composed of parallel sheets. These layers are typically composed of surfactant molecules, lipids, or amphiphilic compounds (which have both hydrophilic and hydrophobic regions) that organize themselves in response to water, oil, and other ingredients in the formulation.

The key characteristic of lamellar liquid crystals is that the molecules within each layer are oriented in a specific way-hydrophilic (water-loving) heads face the water-based layers, and hydrophobic (water-repelling) tails face the oil-based layers. This alignment creates a structure that mimics the natural lipid bilayers found in the skin, making it highly compatible with the skin's natural barrier function.

The inventors found that the lamellar liquid crystal structure of the present cosmetic composition improve the stability of active agents, especially 2-mercaptonicotinoyl glycine, and enhance their delivery into the skin. The unique, highly organized structure helps to stabilize formulations, improve their texture, and provide controlled release of ingredients, ensuring better penetration and longer-lasting effects. Moreover, the structure helps maintain skin hydration by forming a protective layer over the skin, which prevents moisture loss and supports the skin's natural barrier.

(a) 2-Mercaptonicotinoyl Glycine

2-Mercaptonicotinoyl glycine is also known as glycine, N-[(1,2-dihydro-2-thioxo-3-pyridinyl)carbonyl], N-[(1,2-Dihydro-2-thioxo-3-pyridinyl)carbonyl]glycine, and N-[(2-Thioxo-1,2-dihydropyridin-3-yl)carbonyl]glycine, and has the structure shown below.

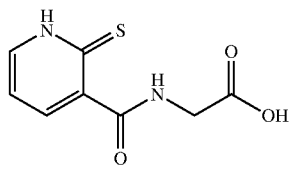 [SMILES: O=C(O)CNC(=O)c1ccc[nH]c1=S]

2-Mercaptonicotinoyl Glycine

2-Mercaptonicotinoyl glycine provides antioxidant and anti-aging properties to the composition. It is formed by combination of nicotinic acid (a form of Vitamin B3) and glycine (an amino acid) with a sulfur-containing thiol group, which contributes to its bioactivity. This unique structure gives it several benefits in the cosmetic application. The thiol (—SH) group in 2-mercaptonicotinoyl glycine acts as a potent antioxidant, scavenging free radicals and protecting the skin from oxidative stress caused by environmental factors such as UV radiation and pollution. The thiol group also has the ability to chelate metal ions, which can help reduce oxidative stress caused by metal-catalyzed reactions in the skin. As a derivative of nicotinic acid, it helps improve skin tone by reducing the appearance of dark spots and pigmentation, contributing to a more even complexion. By combating free radicals and oxidative damage, 2-mercaptonicotinoyl glycine supports collagen preservation and helps reduce the visible signs of aging, such as fine lines and wrinkles.

The cosmetic compositions include 2-mercaptonicotinoyl glycine, for example, in amounts from about 0.05 to about 5 wt. %, based on the total weight of the cosmetic composition. In further embodiments, the cosmetic composition includes from about 0.05 to about 3 wt. %, about 0.05 to about 2 wt. %, about 0.05 to about 1 wt. %, about 0.05 to about 0.8 wt. %, about 0.1 to about 5 wt. %, about 0.1 to about 3 wt. %, about 0.1 to about 2 wt. %, about 0.1 to about 1 wt. %, about 0.1 to about 0.8 wt. %, about 0.2 to about 5 wt. %, about 0.2 to about 3 wt. %, about 0.2 to about 2 wt. %, about 0.2 to about 1 wt. %, or about 0.2 to about 0.8 wt. % of the 2-mercaptonicotinoyl glycine, based on the total weight of the cosmetic composition. Preferably, the cosmetic composition includes from 0.05 to about 3 wt. %, more preferably from about 0.1 to about 2 wt. %, and even more preferably from about 0.2 to about 1 wt. % of the 2-mercaptonicotinoyl glycine, based on the total weight of the cosmetic composition.

(b) Acyl Glycinate Surfactants

Acyl glycinate surfactants are a class of mild, skin-friendly surfactants. These surfactants are derived from the reaction of fatty acids (acyl groups) and glycine, an amino acid. The structure of acyl glycinate surfactants typically consists of a hydrophobic fatty acid chain (the acyl group) attached to a hydrophilic glycine molecule. Nonlimiting examples of acyl glycinate surfactants include sodium cocoyl glycinate, sodium lauroyl glycinate, sodium myristoyl glycinate, potassium lauroyl glycinate, potassium cocoyl glycinate, or a combination thereof. A particularly preferred acyl glycinate surfactant is sodium cocoyl glycinate.

The total amount of the one or more acyl glycinate surfactants in the cosmetic composition will vary but is typically from about 5 to about 25 wt. %, based on the total amount of the cosmetic composition. In further embodiments, the cosmetic composition includes from about 5 to about 20 wt. %, about 5 to about 18 wt. %, about 5 to about 15 wt. %, about 5 to about 12 wt. %, about 5 to about 10 wt. %, about 8 to about 25 wt. %, about 8 to about 20 wt. %, about 8 to about 18 wt. %, about 8 to about 15 wt. %, about 8 to about 12 wt. %, or about 8 to about 10 wt. %, based on the total weight of the cosmetic composition. Preferably, the cosmetic composition includes from about 5 to about 20 wt. %, more preferably from about 6 to about 15 wt. %, and even more preferably from about 7 to about 12 wt. % of one or more acyl glycinate surfactants, based on the total weight of the cosmetic composition.

(c) Salts Providing Divalent Cation

The cosmetic composition includes one or more salts providing divalent cations. The inventors discovered that the salts providing a divalent cation source interact synergistically with anionic polymers to provide a thickening effect and form a lamellar liquid crystal structure. Thus, the cosmetic composition includes one or more salts providing divalent cations having a charge density of about 40 to about 200 C/mm$^3$ and a water solubility of at least 500 g/L.

Charge density is simply the density of charge around an ion, i.e., the ratio of an ion's charge to its volume. Charge densities (Cmm$^{-3}$) are calculated according to the formula:

$$\frac{ne}{(4/3)\pi r^3}$$

where the ionic radii r are the Shannon-Prewitt values in millimeters, e is the electron charge (1.60×10$^{-19}$ C), and n represents the ion charge.

Charge densities and methods for calculating charge densities are known in the art. See, e.g., Shannon, Revised Effective Ionic Radii and Systematic Studies of Interatomic Distances in Halides and Chalcogenides, ACTA CRYST., A32:751-767 (1976), which is incorporated herein by reference in its entirety.

As noted above, the salts providing a divalent cation source typically have a charge density of about 40 to about 200 C/mm$^3$. In certain embodiments, the salts providing a divalent cation source have a charge density of about 45 to about 200 C/mm$^3$, about 50 to about 200 C/mm$^3$, about 60 to about 200 C/mm$^3$, about 100 to about 200 C/mm$^3$, about 40 to about 150 C/mm$^3$, about 50 to about 150 C/mm$^3$, about 60 to 150 C/mm$^3$, or about 100 to about 150 C/mm$^3$.

The solubility of salts in water at 25° C. is also well-known, publicly available, and can be easily calculated. The solubility of the salts providing a divalent cation source in the instant case will vary. Nonetheless, in certain embodiments, the salts have a solubility of at least 400 g/L. In further embodiments, the salts have a solubility of at least 450 g/L, at least 500 g/L, or at least 525 g/L.

Salts that provide a divalent cation are compounds that dissociate in solution to release a cation with a +2 charge (divalent) and an accompanying anion. Divalent cations have two positive charges. Nonlimiting examples of salts that provide divalent cations include magnesium salts, calcium salts, zinc salts, copper salts, and iron salts. For example, magnesium sulfate ($MgSO_4$) provides magnesium ions ($Mg^{2+}$), and calcium chloride ($CaCl_2$)) and calcium lactate ($Ca(C_3H5O_6)_2$) dissociate to release calcium ions ($Ca^{2+}$). Zinc sulfate ($ZnSO_4$) and zinc chloride ($ZnCl_2$) releases Zinc ions ($Zn^{2+}$), copper sulfate ($CuSO_4$) can provide copper ions ($Cu^{2+}$), and iron sulfate ($FeSO_4$) disassociates to release iron ions ($Fe^{2+}$). In a preferred embodiment, the one or more salts providing divalent cations having a charge density of about 40 to about 200 C/mm3 and a water solubility of at least 500 g/L are selected from magnesium salts and calcium salts. Nonlimiting examples of useful magnesium salts and calcium salts include magnesium chloride, calcium chloride, magnesium sulfate, magnesium thiosulfate, calcium thiosulfate, magnesium pyrrolidone carboxylate (magnesium pidolate), calcium pyrrolidone carboxylate (calcium pidolate), magnesium gluconate, or combinations thereof.

The total amount of the salts providing divalent cations having a charge density of about 40 to about 200 C/mm$^3$ and a water solubility of at least 500 g/L in the cosmetic composition will vary but is typically from about 0.05 to about 5 wt. %, based on the total weight of the cosmetic composition. In further embodiments, the cosmetic composition includes from about 0.05 to about 3 wt. %, about 0.05 to about 2 wt. %, about 0.05 to about 1 wt. %, about 0.1 to about 5 wt. %, about 0.1 to about 3 wt. %, about 0.1 to about 2 wt. %, about 0.1 to about 1 wt. %, about 0.2 to about 5 wt. %, about 0.2 to about 3 wt. %, about 0.2 to about 2 wt. %, about 0.2 to about 1 wt. %, about 0.4 to about 5 wt. %, about 0.4 to about 3 wt. %, about 0.4 to about 2 wt. %, about 0.4 to about 1 wt. %, or about 0.4 to about 0.8 wt. % of salts providing divalent cations having a charge density of about 40 to about 200 C/mm$^3$ and a water solubility of at least 500 g/L, based on the total weight of the cosmetic composition. Preferably, the cosmetic composition includes from about 0.1 to about 5 wt. %, more preferably about 0.2 to about 3 wt. %, and even more preferably about 0.3 to about 1 wt. % of one or more salts providing divalent cations having a charge density of about 40 to about 200 C/mm$^3$ and a water solubility of at least 500 g/L, based on the total weight of the cosmetic composition.

(d) Anionic Polymer

In the context of the present disclosure, the term "anionic polymers" is understood as meaning those polymers which carry in a protic solvent under standard conditions at least one structural unit having permanently anionic groups, the anionic groups having to be compensated by counterions while maintaining electroneutrality. As contemplated herein, anionic groups are, for example, carboxylate, sulfate, or sulfonate groups. Nonlimiting examples of anionic polymers include anionic polyurethanes, sodium polynaphthalene sulfonate, sodium lignosulfonate, sodium carboxymethyl cellulose, sodium salt of hydrophobically modified maleic anhydride copolymer, sodium polyacrylate, acrylates copolymer, sodium polymethacrylate, ammonium polyacrylate, ammonium polymethacrylate, sodium salt of polymethacrylic acid, polystyrene sulfonate salts, carrageenan salts, dextran sulfate salts, polyacrylic acid salts, poly(methacrylic acid) salts, alginic acid salts, carboxymethylcellulose salts, polystyrene sulfonate/polystyrene copolymer salts, polystyrene sulfonate/maleic acid copolymers salt, copolymers thereof and combinations thereof.

In various embodiments, the one or more anionic polymers are selected from carboxyvinylpolymers, acrylate copolymers, sulfonate copolymers, and carboxymethylcellulose, and combinations thereof. In various embodiments, the one or more anionic polymers are selected from copolymers of two or more monomers selected from acrylic acid, methacrylic acid, vinyl monomers, and (meth)acrylamide.

In an embodiment, the at least one anionic polymer include copolymers of a (meth)acrylic acid and its esters, referred to herein as an (meth)acrylate copolymer. In some embodiments, the copolymer is an acrylates copolymer, which is used herein, refers to a copolymer of two or more monomers selected from the group consisting of acrylic acid, methacrylic acid, and their simple esters, e.g., lower alkyl esters such as methyl, ethyl esters propyl, butyl and pentyl esters. In some embodiments, the polymer refers to a copolymer of two or more monomers selected from the group consisting of acrylic acid, methacrylic acid and vinyl monomers, (meth)acrylamide. Such copolymers, which may be in the form of an aqueous dispersion, are commercially available from numerous sources, including ACUDYNE® 180, ACUDYNE® BOLD BH Dow Chemical, LUVIFLEX® SOFT from BASF, LUVIMER® 36D from BASF, DERMACRYL® C from Akzo Nobel and SYNTRAN® 5760 by Interpolymer. In some embodiments, the acrylates copolymer is an aqueous dispersion consisting of the ethyl ester of acrylic acid and the methyl ester of methacrylic acid, and which is commercially available from Daito Kasei under the tradename DAITOSOL® 5000AD.

In various embodiments, the one or more anionic polymers may be selected from polyacrylate-15, polyacrylate-21, polyacrylate-17, polyacrylate-18, polyacrylate-19, polyacrylate-2 crosspolymer, acrylates crosspolymer-3, polyacrylate-14, latex acrylates copolymer, styrene/acrylates/ammonium methacrylate copolymer, ammonium acrylates copolymer, polyurethane-1, polyurethane-34, polyurethane-14/AMP-acrylates copolymer, acrylates copolymers of two or more monomers of (meth)acrylic acid or one of their simple esters, acrylic acid/ethyl acrylate/N-tert-butylacrylamide terpolymers, vinyl acetate/vinyl tert-butylbenzoate/crotonic acid terpolymers, crotonic acid/vinyl acetate/vinyl neododecanoate terpolymers, methyl vinyl ether/monoesterified maleic anhydride copolymers, copolymers of methacrylic acid and of methyl methacrylate, copolymers of methacrylic acid and of ethyl acrylate, vinyl acetate/crotonic acid copolymers, vinyl acetate/crotonic acid copolymers grafted by polyethylene glycol, branched block anionic polymer, Acrylates Crosspolymer-4 acrylates Copolymer, carbomers, acrylates/C10-30 alkyl acrylates crosspolymers, acrylates/steareth-20 methacrylate crosspolymer, acrylates/palmeth-25 acrylate copolymer, acrylates/palmeth-20 acrylate copolymer, octylacrylamide/acrylates/butylamino ethyl (metha)crylate copolymer, acrylic acid/C10-C30 alkyl acrylate crosslinked copolymers, crotonic acid/vinyl acetate/vinyl neododecanoate terpolymers, acrylates copolymer, polyacrylate-2, polyacrylate-21, oxyalkylenated stearyl methacrylate/ethylacrylate/methacrylic acid terpolymer, methacrylic acid/ethyl acrylate/oxyethylenated stearyl methacrylate copolymer (55/35/10); (meth)acrylic acid/ethyl acrylate/25 EO oxyethylenated behenyl methacrylate copolymer, methacrylic acid/ethyl acrylate/steareth-10 allyl ether crosslinked copolymer, an alpha olefin hydrocarbon-maleic anhydride copolymer wax, or combinations thereof.

In a preferred embodiment, the one or more anionic polymers are selected from polyacrylic acid, polymethacrylic acid, carboxyvinylpolymer, an acrylate copolymer, a sulfonate polymer, a carboxymethycellulose, a carboxy guar gum, a copolymer of ethylene and maleic acid, an acrylate silicone polymer, and a combination thereof. Particularly preferred are anionic copolymers of two or more monomers selected from acrylic acid, methacrylic acid, vinyl monomers, and (meth)acrylamide. Even more preferably is acrylates copolymer.

The total amount of the one or more anionic polymers in the cosmetic composition will vary but is typically from about 0.1 to about 6 wt. %, based on the total weight of the cosmetic composition. In further embodiments, the cosmetic composition includes from about 0.1 to about 5 wt. %, about 0.1 to about 4 wt. %, about 0.1 to about 3 wt. %, about 0.1 to about 2 wt. %, about 0.5 to about 6 wt. %, about 0.5 to about 5 wt. %, about 0.5 to about 4 wt. %, about 0.5 to about 3 wt. %, about 0.5 to about 2 wt. %, about 0.8 to about 6 wt. %, bout 0.8 to about 5 wt. %, about 0.8 to about 4 wt. %, about 0.8 to about 3 wt. %, about 0.8 to about 2 wt. %, about 1 to about 6 wt. %, about 1 to about 5 wt. %, about 1 to about 4 wt. %, about 1 to about 3 wt. %, or about 1 to about 2 wt. % of the one or more anionic polymers, based on the total weight of the cosmetic composition.

Weight Ratio of (c) to (d)

The one or more salts providing divalent cations having a charge density of about 40 to about 200 $C/mm^3$ of (c) and the one or more anionic polymers of (d) are typically in a weight ratio of about 1.5:1 to about 1:5 ((c):(d)). In further embodiments, the weight ratio of (c) to (d) is from about 1.5:1 to about 1:4, about 1.5:1 to about 1:3, about 1:1 to about 1:5, about 1:1 to about 1:4, about 1:1 to about 1:3, about 1:1.5 to about 1:5, about 1:1.5 to about 1:4, about 1:1.5 to about 1:3, about 1:2 to about 1:5, about 1:2 to about 1:4, or about 1:2 to about 1:3 ((c):(d)). Preferably, the weight ratio of (c) to (d) is from about 1.5:1 to about 1:5, more preferably about 1:1 to about 1:4, and even more preferably about 1:2 to about 1:4 ((c):(d)).

(e) Glycerin

Glycerin, also known as glycerol, is a clear, odorless, and viscous liquid. The amount of glycerin in the cosmetic composition will vary but is typically from about 30 to about 60 wt. %, based on a total weight of the cosmetic composition. In further embodiments, the cosmetic composition includes from about 30 to about 55 wt. %, about 30 to about 50 wt. %, about 30 to about 45 wt. %, about 35 to about 60 wt. %, about 35 to about 55 wt. %, about 35 to about 50 wt. %, about 35 to about 40 wt. %, about 38 to about 60 wt. %, about 38 to about 55 wt. %, about 38 to about 50 wt. %, about 38 to about 45 wt. %, or about 38 to about 42 wt. %, based on the total weight of the cosmetic composition. Preferably, the cosmetic composition includes from about 30 to about 55 wt. %, more preferably about 35 to about 50 wt. %, and even more preferably about 35 to about 45 wt. % of glycerin, based on the total weight of the cosmetic composition.

(f) Water

The amount of water in the cosmetic composition will vary but is typically from about 15 wt. % to about 50 wt. %, based on the total weight of the cosmetic composition. In further embodiments, the cosmetic composition includes from about 15 to about 45 wt. %, about 15 to about 40 wt. %, about 15 to about 35 wt. %, about 15 to about 30 wt. %, about 20 to about 50 wt. %, about 20 to about 45 wt. %, about 20 to about 40 wt. %, about 20 to about 35 wt. %, about 20 to about 30 wt. %, about 25 to about 50 wt. %, about 25 to about 45 wt. %, about 25 to about 40 wt. %, about 25 to about 35 wt. %, or about 25 to about 30 wt. %, based on the total weight of the cosmetic composition. Preferably, the cosmetic composition includes from about 20 to about 45 wt. %, more preferably about 25 to about 40 wt. %, and even more preferably from about 25 to about 35 wt. % of water, based on the total weight of the cosmetic composition.

Weight Ratio of (e) to (f)

The glycerin of (e) and the water of (f) are typically in a weight ratio of about 2:1 to about 1:2 ((e):(f)). In further embodiments, the weight ratio of (e) to (f) is from 2:1 to about 1:1.5, about 1.8:1 to about 1:1.5, about 1.5:1 to about 1:1.5, about 2:1 to about 1:1, about 1.8:1 to about 1:1, about 1.5:1 to about 1:1, about 2:1 to about 1.1:1, about 1.8:1 to about 1.1:1, or about 1.5:1 to about 1.1:1 ((e):(f)). Preferably, the weight ratio of (e) to (f) is from about 2:1 to about 1:1.5, more preferably about 2:1 to about 1:1, and even more preferably about 1.8:1 to about 1.1:1 ((e):(f)).

(g) Reducing Agents

A reducing agent (or reductant) is a substance that donates electrons to another substance during a chemical reaction, reducing the oxidation state of that substance. Useful reducing agents includes those containing sulfur. Sulfur atoms, particularly those in thiol groups (—SH), have a high electron density, making them ready to donate electrons in redox (reduction-oxidation) reactions. Nonlimiting examples of sulfur-containing reducing agents include alkaline-earth metal sulfites, sulfites, thiol-based compounds, salts thereof, or combinations thereof.

The sulfur-containing reducing agents can be organized into three types: (i) thiol-based compounds; (ii) thiosulfate and bisulfite compounds, and (iii) miscellaneous sulfur-containing compounds.

Nonlimiting examples of thiol-based reducing agents include thiolactic acid, glycerol monothiolactate, ammonium thiolactate, MEA-thiolactate, 3-mercaptopropionic acid, glycerol 3-mercaptopropionate, ethyleneglycol 3-mercaptopropionate, cysteamine, N-acetylcysteamine, N-propionylcysteamine, cysteine, N-acetylcysteine, N-alkanoylcysteine, cysteine alkyl esters, homocysteine, thioglycolic acid, ethanolamine thioglycolate, glyceryl thioglycolate, glutathione, thioglycerol, thiomalic acid, thiodiglycol, 2-mercaptoethanol, dithiothreitol, thioxanthine, thiosalicylic acid, thiopropionic acid, lipoic acid, and combinations thereof.

Nonlimiting examples of thiosulfate reducing agents include sodium thiosulfate ($Na_2S_2O_3$), potassium thiosulfate ($K_2S_2O_3$), calcium thiosulfate ($CaS_2O_3$), ammonium thiosulfate (($NH_4)_2S_2O_3$), sodium thiosulfite ($Na_2S_2O_3$), potassium thiosulfite ($K_2S_2O_3$), and combination thereof. Nonlimiting examples of bisulfite reducing agents include sodium bisulfite ($NaHSO_3$), potassium bisulfite ($KHSO_3$), ammonium bisulfite ($NH_4HSO_3$), sodium metabisulfite ($Na_2S_2O_5$), potassium metabisulfite ($K_2S_2O_5$), calcium bisulfite ($Ca(HSO_3)_2$), and combination thereof.

Nonlimiting examples of miscellaneous sulfur-containing reducing agents include Thiosalicylic Acid, Tris-2-Carboxyethylphosphine Hydrochloride (TCEP), Dithiolbutylamine (DTBA), and combinations thereof.

In a preferred embodiment, the one or more reducing agents are selected from ammonium thioglycolate, L-cysteine, N-acetyl L-cysteine, glutathione, ascorbic acid, beta-mercaptoethanol, 2-mercaptoethylamine, 2-mercaptoethylamine hydrochloride, dithiothreitol (DTT), thiolactic acid, thiosalicylic acid, tris-2-carboxyethylphospine hydrochloride (TCEP), sodium hydrosulfite, sodium thiosulfate, potassium disulfite, sodium disulfite, sodium bisulfate, sodium bisulfite, ammonium bisulfite, calcium thioglycolate, potassium thioglycolate, sodium thioglycolate, cysteine hydrochloride, thioglycerin, mercaptopropionic acid, glycerol thioglycolate, and dithiolbutylamine (DTBA), or combinations thereof. In a further preferred embodiment, the one or more reducing agents is selected from thiosulfates and bisulfates, for example, thiosulfates and bisulfates selected from sodium thiosulfate, potassium thiosulfate, calcium thiosulfate, ammonium thiosulfate, sodium thiosulfite, potassium thiosulfate, sodium bisulfite, potassium bisulfite, ammonium bisulfite, sodium metabisulfite, potassium metabisulfite, calcium bisulfite, and combination thereof.

The total amount of the one or more reducing agents in the cosmetic composition will vary but is typically from about 0.05 to about 5 wt. %, based on the total weight of the cosmetic composition. In further embodiments, the cosmetic composition includes from about 0.05 to about 3 wt. %, about 0.05 to about 2 wt. %, about 0.05 to about 1 wt. %, about 0.1 to about 3 wt. %, about 0.1 to about 2 wt. %, or about 0.1 to about 1 wt. % of the one or more reducing agents, based on the total weight of the cosmetic composition. Preferably, the cosmetic composition includes from about 0.05 to about 4 wt. %, more preferably about 0.1 to about 3 wt. %, and even more preferably about 0.1 to about 1 wt. % of one or more reducing agents, based on the total weight of the cosmetic composition.

(h) Low-HLB Nonionic Emulsifers

Nonionic emulsifiers are known in the art and described in the INCI INGREDIENT DICTIONARY AND HANDBOOK (11th Edition 2006), which is incorporated herein by reference in its entirety. The hydrophilic-lipophilic balance (HLB) of a surfactant is a measure of its degree of hydrophilicity or lipophilicity, determined by calculating percentages of molecular weights for the hydrophilic and lipophilic portions of the surfactant molecule, as described by William C. Griffin, (Calculation of HLB Values of Non-Ionic Surfactants, J. OF THE SOC. OF COSMETIC CHEMISTS, 249-259 (1954)), which is incorporated herein by reference in its entirety.

Nonlimiting examples of nonionic emulsifiers that can have an HLB of about 6 or less include the following:

1. Sorbitan esters, such as, sorbitan laurate, sorbitan palmitate, sorbitan sesquiisostearate, sorbitan sesquioleate, sorbitan sesquistearate, sorbitan stearate, sorbitan oleate, sorbitan monoisostearate, sorbitan trisostearate, sorbitan trioleate, sorbitan tristearate, and combinations thereof;
2. Glyceryl esters, such as glyceryl behenate, glyceryl caprate, glyceryl caprylate, glyceryl caprylate/caprate, glyceryl cocoate, glyceryl erucate, glyceryl hydroxystearate, glyceryl isostearate, glyceryl lanolate, glyceryl laurate, glyceryl linoleate, glyceryl myristate, glyceryl oleate, glyceryl palmitate lactate, glyceryl sesquioleate, glyceryl stearate, glyceryl stearate citrate, glyceryl stearate lactate, and combinations thereof;
3. Polyglyceryl esters, such as polyglyceryl-4 isostearate, polyglyceryl-3 oleate, polyglyceryl-2 sesquioleate, triglyceryl diisostearate, diglyceryl monooleate, tetraglyceryl monooleate, and combinations thereof;
4. Glycol esters, such as glycol distearate, glycol hydroxystearate, glycol oleate, glycol ricinoleate, glycol stearate, propylene glycol isostearate, propylene glycol hydroxystearate, propylene glycol laurate, propylene glycol myristate, propylene glycol oleate, propylene glycol ricinioleate, propylene glycol stearate, and combinations thereof;
5. Sucrose esters, such as sucrose cocoate and sucrose laurate, and combinations thereof
6. Methyl glucose esters, such as methyl glucose sesquistearate, methyl glucose dioleate, and combinations thereof.

In a preferred embodiment, the one or more nonionic emulsifiers having an HLB of about 6 or less are selected from glycol esters, glycerol esters, or a combination thereof, for example, one or more selected from glycol distearate, glycol hydroxystearate, glycol oleate, glycol ricinoleate, glycol stearate, propylene glycol isostearate, propylene glycol hydroxystearate, propylene glycol laurate, propylene glycol myristate, propylene glycol oleate, propylene glycol ricinioleate, propylene glycol stearate, diglyceryl polyacyladipate-2, glyceryl behenate, glyceryl erucate, glyceryl hydroxystearate, glyceryl isostearate, glyceryl lanolate, glyceryl laurate, glyceryl linoleate, glyceryl myristate, glyceryl oleate, glyceryl palmitate lactate, glyceryl sesquioleate, glyceryl stearate, citrate, glyceryl dioleate, glyceryl distearate, glyceryl laurate, or a combination thereof. In at least one instance the glyceryl ester comprises glyceryl stearate, bis-diglyceryl polyacyladipate, glyceryl ricinoleate, or a combination thereof.

Nonlimiting examples of nonionic emulsifiers having an HLB of about 6 or less are presented below.

| Nonionic Emulsifiers having HLB of About 6 or Less | HLB |
|---|---|
| Ethylene glycol distearate | 1.5 |
| Sorbitan trioleate (Span 85) | 1.8 |
| Sorbitan trioleate (Arlacel 85) | 1.8 |
| Polyoxyethylene sorbitol beeswax derivative (Atlas G-1706) | 2.0 |
| Sorbitan tristearate (Span 65) | 2.1 |
| Sorbitantristearate (Arlacel 65) | 2.1 |
| Polyoxyethylene sorbitol hexastearate (Atlas G-1050) | 2.6 |
| Ethyleneglycol fatty acid ester (Emcol EO-50) | 2.7 |
| Ethyleneglycol fatty acid ester (Emcol ES-50) | 2.7 |
| Polyoxyethylene sorbitol beeswax derivative (Atlas G-1704) | 3.0 |
| Glyceryl monooleate | 3.3 |
| Propylene glycol monostearate | 3.4 |
| Propylene glycol fatty acid ester (Emcol PO-50) | 3.4 |
| Propylene glycol fatty acid ester (Atlas G-922) | 3.4 |
| "Pure" propylene glycol fatty acid ester | 3.4 |
| Propylene glycol fatty acid ester (Atlas G-2158) | 3.4 |
| Ethylene glycol fatty acid ester (Emcol PS-50) | 3.4 |
| Ethyleneglycol fattyacid ester (Emcol EL-50) | 3.6 |
| Propylene glycol fatty acid ester (Emcol PP-50) | 3.7 |
| Sorbitan sesquioleate (Arlacel C) | 3.7 |
| Sorbitan sesquiolate (Arlacel 83) | 3.7 |
| Polyoxyethyle esorbitol 4,5 oleate (AtlasG-2859) | 3.7 |
| Glycerol monostearate (Atmul 67) | 3.8 |
| Glycerol monostearate (Atmul 84) | 3.8 |
| "Pure" hydroxylatedlanolin | 3.8 |
| Polyoxyethylene sorbitol beeswax | 4.0 |
| Propylene glycol fatty acid ester | 4.1 |
| Sorbitan monoleate (Span 80) | 4.3 |
| Propylene glycol monolaurate (Atlas G-917) | 4.5 |
| Propylene glycol fatty acid ester (EmcolPL-50) | 4.5 |
| Sorbitan monostearate | 4.7 |
| Sorbitan Isostearate | 4.7 |
| Diethylene glycol monooleate (AtlasG-2139) | 4.7 |
| Diethyleneglycol fatty acid ester (Emcol DO-50) | 4.7 |
| Diethylene glycol monostearate (AtlasG-2146) | 4.7 |
| Diethyleneglycol fatty acid ester (Emcol DS-50) | 4.7 |
| Oolyoxyethylene sorbitol beeswax derivative (AtlasG-1702) | 5.0 |
| Diethylene glycol fatty acid ester (Emcol DP-50) | 5.1 |
| Glycerol monostearate | 5.5 |
| Glycerol monostearate | 5.5 |
| Methyl glucoside sesquistearate | 6.0 |
| Diethylene glycol monolaurate (AtlasG-2124) | 6.1 |

In another preferred embodiment the one or more nonionic emulsifiers have an HLB of about 1 to about 5, including those selected from glycol distearate, sorbitan trioleate, propylene glycol isostearate, glycol stearate, sorbitan sesquioleate, glyceryl stearate, lecithin, sorbitan oleate, sorbitan monostearate NF, sorbitan stearate, sorbitan isostearate, steareth-2, oleth-2, or a combination thereof.

The amount of the one or more nonionic emulsifiers having an HLB of about 6 or less in the cosmetic compositions will vary but is typically from about 1 to about 10 wt. %, based on the total weight of the cosmetic composition. In further embodiments, the cosmetic composition includes from about 1 to about 8 wt. %, about 1 to about 6 wt. %, about 1 to about 5 wt. %, about 1 to about 4 wt. %, about 2 to about 10 wt. %, about 2 to about 8 wt. %, about 2 to about 6 wt. %, about 2 to about 5 wt. %, about 2 to about 4 wt. %, or about 2.5 to about 3.5 wt. % of one or more nonionic emulsifiers having an HLB of about 6 or less, based on the total weight of the cosmetic composition. Preferably, the cosmetic composition includes from about 1 to about 8 wt. %, more preferably from about 1.5 to about 6 wt. %, and even more preferably from about 2 to about 5 wt. % of one or more nonionic emulsifiers having an HLB of about 6 or less, based on the total weight of the cosmetic composition.

(i) Skin Active Agents

A "skin active agent" is an ingredient or compound that actively works to improve the appearance, health, or function of the skin. These agents are specifically chosen for their ability to produce measurable biological effects or benefits when applied to the skin. They may target a range of skin concerns, such as hydration, anti-aging, pigmentation, acne, or skin irritation, and are often formulated to interact with the skin at a cellular level. Nonlimiting examples of skin active agents include antioxidants, depigmenting agents, anti-wrinkle agents, photoprotective agents, self-tanning agents, desquamating agents, moisturizing agents, anti-aging ingredients, and mixtures thereof Nonlimiting examples of antioxidants include tocopherols (e.g., d-α-tocopherol, d-β-tocopherol, d-γ-tocopherol, d-delta-tocopherol), tocotrienols (e.g., d-α-tocotrienol, d-β-tocotrienol, d-γ.-tocotrienol, d-delta-tocotrienol,) and vitamin E (α-tocopherol acetate). These compounds may be isolated from natural sources, prepared by synthetic means, or combinations thereof. Tocotrienol-enriched vitamin E preparations may be obtained by fractionating vitamin E preparations to remove a portion of tocopherols and recover a preparation more highly concentrated in tocotrienol. Useful tocotrienols are natural products isolated, for example, from wheat germ oil, grain, or palm oil using high performance liquid chromatography, or isolated by alcohol extraction and/or molecular distillation from barley, brewer's grain or oats. As used herein, the term "tocotrienols" includes tocotrienol-rich-fractions obtained from these natural products as well as the pure compounds. The increased glutathione peroxidase activity protects the skin from oxidative damage.

Sesame (*Sesamum indicum*) or sesame lignan may also be added. Sesame and its lignans (the fibrous compounds associated with the sesame) act as antioxidants. Sesame seed lignans significantly enhance vitamin E activity.

In addition, carotenoids, particularly the xanthophyll type, are also useful antioxidants that can be used. The xanthopyll type carotenoids include molecules, such as lutein, canthaxantin, cryptoxanthin, zeaxanthin and astaxanthin. Xanthophylls protect compounds, such as vitamin A, vitamin E, and other carotenoids.

Flavonoids can also function as antioxidants. In some instances, the flavonoid is a flavanone (derivative of 2,3-dihydro-2-phenylchromen-4-one). Flavones include: Butin, Eriodictyol, Hesperetin, Hesperidin, Homoeriodictyol, Isosakuranetin, Naringenin, Naringin, Pinocembrin, Poncirin, Sakuranetin, Sakuranin, and Sterubin. The flavonoid may be a flavanonol (derivative of 3-hydroxy-2,3-dihydro-2-phenylchromen-4-one). Flavanols include: Taxifolin, Aromadedrin, Chrysandroside A, Chrysandroside B, Xeractinol, Astilbin, and Fustin. The flavonoid may be a flavone (derivative of 2-phenylchromen-4-one). Flavones include: Apigenin, Luteolin, Tangeritin, Chrysin, Baicalein, Scutellarein, Wogonin, Synthetic Flavones: Diosmin, and Flavoxate. The flavonoid may be a flavonol (derivative of 3-hydroxy-2-phenylchromen-4-one). Flavonols include: 3-Hydroxyflavone, Azaleatin, Fisetin, Galangin, Gossypetin, Kaempferide, Kaempferol, Isorhamnetin, Morin, Myricetin, Natsudaidain, Pachypodol, Quercetin, Rhamnazin, Rhamnetin, Azalein, Hyperoside, Isoquercitin, Kaempferitrin, Myricitrin, Quercitrin, Robinin, Rutin, Spiraeoside, Xanthorhamnin, Amurensin, Icariin, and Troxerutin. The flavonoid may be a flavan-3-ol (derivatives of 2-phenyl-3,4-dihydro-2H-chromen-3-ol). Flavan-3-ols include: Catechin, Epicatechin, Epigallocatechin, Epicatechin gallate, Epigallocatechin gallate, Epiafzelechin, Fisetinidol, Guibourtinidol, Mesquitol, and Robinetinidol. The flavonoid may be a flavan-4-ol (derivative of 2-phenylchroman-4-ol). Flavan-4-ols include: Apiforol and Luteoforol. The flavonoid may be an isoflavone (derivative of 3-phenylchromen-4-one). Isoflavones include: Genistein, Daidzein, Biochanin A, Formononetin, and the Equol metabolite from Daidzein.

The antioxidant may be an anthocyanidin (derivative of 2-phenylchromenylium cation). Anthocyanidins include: Aurantinidin, Cyanidin, Delphinidin, Europinidin, Luteolinidin, Pelargonidin, Malvidin, Peonidin, Petunidin, Rosinidin, and Xanthone.

The antioxidant may be a Dihydrochalcone (derivative of 1,3-diphenyl-1-propanone). Dihydrochalcones include: Phloretin, Dihydrochalcone phloretin Phlorizin, Aspalathin, Naringin dihydrochalcone, Neohesperidin dihydrochalcone, and Nothofagin. Without limiting the mode of action of the invention, dihydrochalcones may exert an antioxidant effect by reducing reactive free radicals, like reactive oxygen and reactive nitrogen species.

The antioxidant may be an anthocyanin. Anthocyanins and their derivatives are antioxidants. Anthocyanins encompasses a class of flavonoid compounds that are naturally occurring, water-soluble compounds, responsible for the red, purple, and blue colors of many fruits, vegetables, cereal grains, and flowers. Additionally, anthocyanins are collagenase inhibitors. The inhibition of collagenase helps in the prevention and reduction of wrinkles, increase in skin elasticity, etc., which are caused by a reduction in skin collagen. The anthocyanins may be obtained from any portion of various plant sources, such as the fruit, flower, stem, leaves, root, bark, or seeds. One of skill in the art will understand that certain portions of the plant may contain higher natural levels of anthocyanins, and, therefore, those portions are used to obtain the desired anthocyanins. In some instances, antioxidants may include one or more betacyanin. Betacyanins, like anthocyanins, may be obtained from natural sources and are antioxidants.

The antioxidant may be a phenylpropanoid (derivatives of cinnamic acid). Phenylpropanoids include: Cinnamic acid, Caffeic acid, Ferulic acid, Trans-ferulic acid (including its antioxidant pharmacore 2,6-dihydroxyacetophenome), 5-Hydroxyferulic acid, Sinapic acid, Coumaryl alcohol, Coniferyl alcohol, Sinapyl alcohol, Eugenol, Chavicol, Safrole, P-coumaric acid, and Sinapinic acid. Without limiting the mode of action of the invention, Phenylpropanoids may neutralize free radicals.

The antioxidant may be a Chalcone (derivative of 1,3-diphenyl-2-propen-1-one). Chalcones include: Butein, Okanin, Carthamin, Marein, Sophoradin, Xanthohumol, Flavokvain A, Flavokavain B, Flavokavin C, and synthetic Safalcone.

The antioxidant may be a Curcuminoid. Curcuminoids include: Curcumin, Desmethoxycurcumin, bis-Desmethoxycurcumin, Tetrahydrocurcumin, and Tetrahydrocurcuminoids. Curcumin and tetrahydrocurcuminoids may be derived from rhizomes of *Curcuma longa*. Tetrahydrocurcumin, a metabolite of curcumin, has been found to be a more potent antioxidant and more stable compared to curcumin.

The antioxidant may be a Tannin. Tannins include: Tannin, Terflavin B, Glucogallin, Dgallic acid, and Quercitannic acid.

The antioxidant may be a stilbenoid. Stilbenoids include: resveratrol, pterostilbene, and piceatannol. Resveratrol may include, but is not limited to, 3,5,4'-trihydroxystilbene, 3,4,3',5'-tetrahydroxystilbene (piceatannol), 2,3',4,5'-tetrahydroxystilbene (oxyresveratrol), 4,4'-dihydroxystilbene, and alpha and beta glucoside, galactoside and mannoside derivatives thereof.

The antioxidant may be a coumarin (derivatives of 2H-chromen-2-one). Coumarins include: 4-hydroxycoumarin, umbelliferone, sesculetin, herniarin, suraptene, and ficoumarol.

The antioxidant may be a varotenoid. Carotenoids include: beta-varotene, alpha-varotene, gamma-varotene, beta-vryptoxanthin, lycopene, lutein, and idebenone. Sesame (*Sesamum indicum*) or sesame lignan may also be added. Sesame and its lignans (the fibrous compounds associated with the sesame) act as antioxidants. Sesame seed lignans significantly enhance vitamin E activity.

The antioxidant may be: a xanthone, butylated hydroxytoluene, 2,6-Di-tert-butylphenol, 2,4-Dimethyl-6-tert-butylphenol, Gallic acid, Eugenol, Uric acid, alpha-Lipoic acid, Ellagic acid, Chicoric acid, Chlorogenic acid, Rosmarinic acid, Salicylic acid, Acetylcysteine, S-Allyl cysteine, Barbigerone, Chebulagic acid, Edaravone, Ethoxyquin, Glutathione, Hydroxytyrosol, Idebenone, Melatonin, N-Acetylserotonin, Nordihydroguaiaretic acid, Oleocanthal, Oleuropein, Paradol, Piceatannol, Probucol, Propyl gallate, Protocatechuic acid, Pyritinol, Rutin, Secoisolariciresinol diglucoside, Sesamin, Sesamol, Silibinin, Silymarin, Theaflavin, Theaflavin digallate, Thmoquinone, Trolox, Tyrosol, Polyunsaturated fatty acids, and sulfur-based antioxidants such as Methionine or Lipoic acid.

Nonlimiting examples of depigmenting agents include alpha and beta arbutin, ferulic acid, lucinol and its derivatives, kojic acid, resorcinol and derivatives thereof, tranexamic acid and derivatives thereof, gentisic acid, homogentisic, methyl gentisate or homogentisate, dioic acid, D pantheteine calcium sulphonate, lipoic acid, ellagic acid, vitamin B3, linoleic acid and its derivatives, certain compounds derived from plants such as chamomile, bearberry, the aloe family (vera, *ferox*, bardensis), mulberry, skullcap, a water kiwi fruit (*Actinidia chinensis*) marketed by Gattefosse, an extract of *Paeonia suffruticosa* root, such as that sold by Ichimaru Pharcos under the name Liquid Botanpi Be an extract of brown sugar (*Saccharum officinarum*) such as molasses extract marketed by Taiyo Kagaku under the name Liquid Molasses®, without this list being exhaustive. Particular depigmenting agents include alpha and beta arbutin, ferulic acid, kojic acid, resorcinol and derivatives, D pantheteine calcium sulfonate, lipoic acid, ellagic acid, vitamin B3, a water kiwi fruit (*Actinidia chinensis*) marketed by Gattefosse, an extract of *Paeonia suffruticosa* root, such as that sold by the company Ichimaru Pharcos under the name Botanpi® Liquid B.

The term "anti-wrinkle agent" refers to a natural or synthetic compound producing a biological effect, such as the increased synthesis and/or activity of certain enzymes, when brought into contact with an area of wrinkled skin, this has the effect of reducing the appearance of wrinkles and/or fine lines. Nonlimiting examples of anti-wrinkle agents include: desquamating agents, anti-glycation agents, inhibitors of NO-synthase, agents stimulating the synthesis of dermal or epidermal macromolecules and/or preventing their degradation, agents for stimulating the proliferation of fibroblasts and/or keratinocytes, or for stimulating keratinocyte differentiation reducing agents; muscle relaxants and/or dermo-decontracting agents, anti-free radical agents, and combinations thereof. Examples of such compounds are: adenosine and its derivatives and retinoids other than retinol (as discussed above, such as retinol palmitate), ascorbic acid and its derivatives such as magnesium ascorbyl phosphate and ascorbyl glucoside; nicotinic acid and its precursors such as nicotinamide; ubiquinone; glutathione and precursors thereof such as L-2-oxothiazolidine-4-carboxylic acid, the compounds C-glycosides and their derivatives as described in particular in EP-1345919, in particular C-beta-D-xylopyranoside-2-hydroxy-propane as described in particular in EP-1345919, plant extracts including sea fennel and extracts of olive leaves, as well as plant and hydrolysates thereof such as rice protein hydrolysates or soybean proteins; algal extracts and in particular *laminaria*, bacterial extracts, the sapogenins such as diosgenin and extracts of *Dioscorea* plants, in particular wild yam, comprising: the a-hydroxy acids, b-hydroxy acids, such as salicylic acid and n-octanoyl-5-salicylic oligopeptides and pseudodipeptides and acyl derivatives thereof, in particular acid {2-[acetyl-(3-trifluoromethyl-phenyl)-amino]-3-methyl-}acetic acid and lipopeptides marketed by the company under the trade names SEDERMA Matrixyl 500 and Matrixyl 3000; lycopene, manganese salts and magnesium salts, especially gluconates, and combinations thereof. In at least one case, the skin tightening composition includes adenosine derivatives, such as non-phosphate derivatives of adenosine, such as in particular the 2'-deoxyadenosine, 2',3'-adenosine isopropoylidene; the toyocamycine, 1-methyladenosine, N-6-methyladenosine; adenosine N-oxide, 6-methylmercaptopurine riboside, and the 6-chloropurine riboside. Other derivatives include adenosine receptor agonists such as adenosine phenylisopropyl ("PIA"), 1-methylisoguanosine, N6-cyclohexyladenosine (CHA), N6-cyclopentyladenosine (CPA), 2-chloro-N6-cyclopentyladenosine, 2-chloroadenosine, N6-phenyladenosine, 2-phenylaminoadenosine, MECA, N 6-phenethyladenosine, 2-p-(2-carboxy-ethyl) phenethyl-amino-5'-N-ethylcarboxamido adenosine (CGS-21680), N-ethylcarboxamido-adenosine (NECA), the 5'(N-cyclopropyl)-carboxamidoadenosine, DPMA (PD 129.944) and metrifudil.

In a preferred embodiment, the cosmetic composition includes one or more skin active agents selected form niacinamide, alpha hydroxy acids, beta hydroxy acids, polyhydroxy acids, or combinations thereof. Nonlimiting examples of alpha hydroxy acids include glycolic acid, lactic acid, citric acid, malic acid, tartaric, and mandelic acid. Nonlimiting examples of beta hydroxy acids include salicylic acid, betaine salicylate, willow bark extract, terephthalic acid, tannic acid, or combinations thereof. Nonlimiting examples of polyhydroxy acids include gluconolactone, lactobionic acid, galactose, or combinations thereof. In a particularly preferred embodiment, the cosmetic composition includes one or more skin active agents selected from niacinamide, salicylic acid, lactic acid, glycolic acid, sulfur, allantoin, or combinations thereof.

With respect to the total amount of skin active agents in the cosmetic compositions, if present, the total amount of skin active agents may be from greater than zero to about 9 wt. %, greater than zero to about 8 wt. %, greater than zero to about 7 wt. %, greater than zero to about 6 wt. %, greater than zero to about 5 wt. %, greater than zero to about 4 wt. %, greater than zero to about 3 wt. %, greater than zero to about 2 wt. %; about 10 ppm to about 10 wt. % (100,000 ppm), about 10 ppm to about 5 wt. % (50,000 ppm), about 10 ppm to about 2.5 wt. % (25,000 ppm), about 10 ppm to about 1 wt. % (10,000 ppm), about 10 ppm to about 0.5 wt. % (5,000 ppm), about 10 ppm to about 0.3 wt. % (3,000 ppm), about 10 ppm to about 0.2 wt. % (2,000 ppm), about 10 ppm to about 0.1 wt. % (1,000 ppm), about 10 ppm to 500 ppm; about 0.1 to about 10 wt. %, about 0.1 to about 5 wt. %, about 0.1 to about 2.5 wt. %, about 0.1 to about 1 wt. %, about 0.1 to about 0.5 wt. %; about 1 to about 10 wt. %, about 1 to about 8 wt. %, about 1 to about 6 wt. %, about 1 to about 5 wt. %, about 1 to about 4 wt. %, or about 1 to about 3 wt. %, based on the total weight of the cosmetic composition.

Preferably, the cosmetic composition includes from about 0.1 to about 8 wt. %, more preferably about 0.5 to about 5 wt. %, and even more preferably about 1 to about 6 wt. % of one or more skin active agents, based on the total weight of the cosmetic composition.

(j) Humectants

The cosmetic composition may optionally include one or more humectants. A humectant is a substance that attracts and retains moisture from the environment and draws it into the skin or other surfaces. Examples include hyaluronic acid, sorbitol, urea, aloe vera, and glycols having from 2 to 8 carbon atoms, monosaccharides, disaccharides, and sugar alcohols. A glycol is a type of alcohol containing two hydroxyl groups (—OH) attached to adjacent carbon atoms. Nonlimiting examples of glycols having from 2 to 8 carbon atoms include ethylene glycol, propylene glycol, butylene glycol, pentylene glycol, hexylene glycol, dipropylene glycol. Preferred polyols having from 2 to 8 carbon atoms include glycerin, ethylene glycol, propylene glycol, butylene glycol, and dipropylene glycol. Nonlimiting examples of monosaccharides includes glucose, fructose, galactose, ribose, deoxyribose, xylose, arabinose, and mannose. Nonlimiting examples of disaccharides include sucrose, lactose, maltose, trehalose, and cellobiose. Nonlimiting examples of sugar alcohols include erythritol, xylitol, sorbitol, mannitol, isomalt, lactitol, maltitol, hydrogenated starch hydrolysates, polyglycitol syrup, arabitol, ribitol, iditol, galactitol, talitol, allitol, dulcitol, glycerol, threitol, isosorbide, sorbitan, xylitan, mannitan, maltitol syrup, glycitol, and sorbitol syrup.

In a preferred embodiment, the cosmetic composition includes one or more glycols having from 2 to 8 carbon atoms, in particular, one or more glycols selected from ethylene glycol, propylene glycol, butylene glycol, pentylene glycol, dipropylene glycol, or combinations thereof.

The total amount of the one or more humectants in the cosmetic composition will vary but is typically from about 0.1 to about 10 wt. %, based on the total weight of the cosmetic composition. In further embodiments, the cosmetic composition includes from about 0.1 to about 8 wt. %, about 0.1 to about 5 wt. %, about 0.1 to about 3 wt. %, about 0.5 to about 10 wt. %, about 0.5 to about 8 wt. %, about 0.5 to about 5 wt. %, about 0.5 to about 3 wt. %, about 1 to about 10 wt. %, about 1 to about 8 wt. %, about 1 to about 5 wt. %, or about 1 to about 3 wt. % of one or more humectants, based on the total weight of the cosmetic composition. Preferably, the cosmetic composition includes from about 0.1 to about 8 wt. %, more preferably about 0.5 to about 6 wt. %, and even more preferably about 1 to about 5 wt. % of one or more humectants, based on the total weight of the cosmetic composition.

(k) Miscellaneous Ingredients

Miscellaneous ingredients are ingredients that are compatible with the cleansing compositions and do not disrupt or materially affect the basic and novel properties of the compositions. Nonlimiting examples of miscellaneous ingredients include preservatives, fragrances, pH adjusters, salts, chelating agents, skin active ingredients, buffers, antioxidants, flavonoids, de-pigmenting agents, anti-wrinkle agents, vitamins, botanical extracts, UV filtering agents, proteins, protein hydrolysates and/or isolates, fillers (e.g., organic and/or inorganic fillers such as talc, calcium carbonate, silica, etc.) composition colorants, etc.

In the context of the instant disclosure, a "composition colorant" is a compound that colors the composition but does not have an appreciable coloring effect on hair. In other words, the composition colorant is included to provide a color to the composition for aesthetic appeal but is not intended to impart coloring properties to hair. As an example, hair styling gels, can be found in a variety of different colors (e.g., light blue, light pink, etc.) yet application of the styling gel to hair does not visibly change the color of the hair.

The amount of the one or more miscellaneous ingredients in the cosmetic composition, if present, will vary. Nonetheless, in various embodiments, the cosmetic composition includes about 0.01 to about 10 wt. % of the one or more miscellaneous ingredients, based on a total weight of the cosmetic composition. In further embodiments, the cosmetic composition includes about 0.01 to about 8 wt. %, about 0.01 to about 6 wt. %, about 0.01 to about 5 wt. %, about 0.01 to about 3 wt. %, about 0.05 to about 10 wt. %, about 0.05 to about 8 wt. %, about 0.05 to about 6 wt. %, about 0.05 to about 5 wt. %, about 0.1 to about 10 wt. %, about 0.1 to about 8 wt. %, about 0.1 to about 6 wt. %, about 0.1 to about 5 wt. % of one or more miscellaneous ingredients, based on a total weight of the cosmetic composition.

Cationic Polymers

The cosmetic composition may optionally include (or exclude) one or more cationic polymers. Cationic polymers as defined in the context of the instant disclosure are polymers bearing a positive charge or incorporating cationic entities in their structure. The cationic polymers can comprise mixtures of monomer units derived from amine- and/or quaternary ammonium-substituted monomer and/or compatible spacer monomers. Cationic polymers often provide conditioning benefits to the hair treatment compositions and therefore may be referred to as "cationic conditioning polymers."

Nonlimiting examples of cationic polymers include copolymers of 1-vinyl-2-pyrrolidine and 1-vinyl-3-methyl-imidazolium salt (e.g., chloride salt) (referred to as Polyquaternium-16); copolymers of 1-vinyl-2-pyrrolidine and dimethylaminoethyl methacrylate (referred to as Polyquaternium-11); cationic diallyl quaternary ammonium-containing polymer including, for example, dimethyldiallyammonium chloride homopolymer and copolymers of acrylamide and dimethyldiallyammonium chloride (referred to as Polyquaternium-6 and Polyquaternium-7); polysaccharide polymers, such as cationic cellulose derivatives and cationic starch derivatives. Cationic cellulose is available as salts of hydroxyethyl cellulose reacted with trimethyl ammonium substituted epoxide (referred to as Polyquaternium-10). Another type of cationic cellulose includes the polymeric quaternary ammonium salts of hydroxyethyl cellulose reacted with lauryl dimethyl ammonium-substituted epoxide (referred to as Polyquaternium-24). Additionally or alternatively, the cationic conditioning polymers may include or be chosen from cationic guar gum derivatives, such as guar hydroxypropyltrimonium chloride.

Preferred cationic polymers include cationic polysaccharide polymers, such as cationic cellulose, cationic starch, and cationic guar gum. In the context of the instant disclosure cationic polysaccharide polymers include cationic polysaccharides and polysaccharide derivatives (e.g., derivatized to be cationic), for example, resulting in cationic cellulose (cellulose derivatized to be cationic), cationic starch (derivatized to be cationic), cationic guar (guar derivatized to be cationic).

Nonlimiting examples of cationic celluloses include hydroxyethylcellulose (also known as HEC), hydroxymethylcellulose, methylhydroxyethylcellulose, hydroxypropylcellulose (also known as HPC), hydroxybutylcellulose, hydroxyethylmethylcellulose (also known as methyl hydroxyethylcellulose) and hydroxypropylmethylcellulose (also known as HPMC), cetyl hydroxyethylcellulose, polyquaternium-10, polyquaternium-24, and mixtures thereof, preferably polyquaternium-10, polyquaternium-24, and mixtures thereof.

Nonlimiting examples of cationic guar include guar hydroxypropyltrimonium chloride, hydroxypropyl guar hydroxypropyltrimonium chloride, guar dimethylhydroxypropyltrimonium chloride, guar hydroxypropyltrimonium methylsulfate, cationic guar (cationic guar gum), and guar polyquaternium-7.

Nonlimiting examples of cationic starch include starch hHydroxypropyltrimonium chloride, hydroxypropyl oxidized starch PG trimonium chloride, and a mixture thereof.

The cosmetic composition may include or be chosen from polyquaterniums. For example, the hair treatment composition may include Polyquaternium-1 (ethanol, 2,2',2"-nitrilotris-, polymer with 1,4-dichloro-2-butene and N,N,N',N'-tetramethyl-2-butene-1,4-diamine), Polyquaternium-2, (poly[bis(2-chloroethyl) ether-alt-1,3-bis[3-(dimethylamino)propyl]urea]), Polyquaternium-4, (hydroxyethyl cellulose dimethyl diallylammonium chloride copolymer; Diallyldimethylammonium chloride-hydroxyethyl cellulose copolymer), Polyquaternium-5 (copolymer of acrylamide and quaternized dimethylammoniumethyl methacrylate), Polyquaternium-6 (poly(diallyldimethylammonium chloride)), Polyquaternium-7 (copolymer of acrylamide and diallyldimethylammonium chloride), Polyquaternium-8 (copolymer of methyl and stearyl dimethylaminoethyl ester of methacrylic acid, quaternized with dimethylsulphate), Polyquaternium-9 (homopolymer of N,N-(dimethylamino)ethyl ester of methacrylic acid, quaternized with bromomethane), Polyquaternium-10 (quaternized hydroxyethyl cellulose), Polyquaternium-11 (copolymer of vinylpyrrolidone and quaternized dimethylaminoethyl methacrylate), Polyquaternium-12 (ethyl methacrylate/abietyl methacrylate/diethylaminoethyl methacrylate copolymer quaternized with dimethyl sulfate), Polyquaternium-13 (ethyl methacrylate/oleyl methacrylate/diethylaminoethyl methacrylate copolymer quaternized with dimethyl sulfate), Polyquaternium-14 (trimethylaminoethylmethacrylate homopolymer), Polyquaternium-15 (acrylamide-dimethylaminoethyl methacrylate methyl chloride copolymer), Polyquaternium-16 (copolymer of vinylpyrrolidone and quaternized vinylimidazole), Polyquaternium-17 (adipic acid, dimethylaminopropylamine and dichloroethylether copolymer), Polyquaternium-18 (azelanic acid, dimethylaminopropylamine and dichloroethylether copolymer), Polyquaternium-19 (copolymer of polyvinyl alcohol and 2,3-epoxypropylamine), Polyquaternium-20 (copolymer of polyvinyl octadecyl ether and 2,3-epoxypropylamine), Polyquaternium-22 (copolymer of acrylic acid and diallyldimethylammonium chloride), Polyquaternium-24 (auaternary ammonium salt of hydroxyethyl cellulose reacted with a lauryl dimethyl ammonium substituted epoxide), Polyquaternium-27 (block copolymer of Polyquaternium-2 and Polyquaternium-17), Polyquaternium-28 (copolymer of vinylpyrrolidone and methacrylamidopropyl trimethylammonium), Polyquaternium-29 (chitosan modified with propylen oxide and quaternized with epichlorhydrin), Polyquaternium-30 (ethanaminium, N-(carboxymethyl)-N,N-dimethyl-2-[(2-methyl-1-oxo-2-propen-1-yl)oxy]-, inner salt, polymer with methyl 2-methyl-2-propenoate), Polyquaternium-31 (N,N-dimethylaminopropyl-N-acrylamidine quatemized with diethylsulfate bound to a block of polyacrylonitrile), Polyquaternium-32 (poly(acrylamide 2-methacryloxyethyltrimethyl ammonium chloride)), Polyquaternium-33 (copolymer of trimethylaminoethylacrylate salt and acrylamide), Polyquaternium-34 (copolymer of 1,3-dibromopropane and N,N-diethyl-N',N'-dimethyl-1,3-propanediamine), Polyquaternium-35 (methosulphate of the copolymer of methacryloyloxyethyltrimethylammonium and of methacryloyloxyethyldimethylacetylammonium), Polyquaternium-36 (copolymer of N,N-dimethylaminoethylmethacrylate and buthylmethacrylate, quaternized with dimethylsulphate), Polyquaternium-37 (poly(2-methacryloxyethyltrimethylammonium chloride)), Polyquaternium-39 (terpolymer of acrylic acid, acrylamide and diallyldimethylammonium Chloride), Polyquaternium-42 (poly[oxyethylene(dimethylimino)ethylene (dimethylimino)ethylene dichloride]), Polyquaternium-43 (copolymer of acrylamide, acrylamidopropyltrimonium chloride, 2-amidopropylacrylamide sulfonate and dimethylaminopropylamine), Polyquaternium-44 (3-Methyl-1-vinylimidazolium methyl sulfate-N-vinylpyrrolidone copolymer), Polyquaternium-45 (copolymer of (N-methyl-N-ethoxyglycine)methacrylate and N,N-dimethylaminoethylmethacrylate, quaternized with dimethyl sulphate), Polyquaternium-46 (terpolymer of vinylcaprolactam, vinylpyrrolidone, and quaternized vinylimidazole), Polyquaternium-47 (terpolymer of acrylic acid, methacrylamidopropyl trimethylammonium chloride, and methyl acrylate), and/or Polyquaternium-67.

In some instances, the cosmetic composition includes one or more cationic polymers selected from cationic cellulose derivatives, quaternized hydroxyethyl cellulose (e.g., polyquaternium-10), cationic starch derivatives, cationic guar gum derivatives, copolymers of acrylamide and dimethyldiallyammonium chloride (e.g., polyquaternium-7), polyquaterniums, and a mixture thereof. For example, the cationic polymer(s) may be selected from polyquaterniums, for example, polyquaterniums selected from polyquaternium-4, polyquaternium-5, polyquaternium-6, polyquaternium-7, polyquaternium-10, polyquaternium-22, polyquaternium-37, polyquaternium-39, polyquaternium-47, polyquaternium-53, polyquaternium-67 and a mixture thereof. A combination of two or more polyquaterniums can be useful. A particularly preferred and useful cationic polymer is polyquaternium-10.

The cationic polymers may be a polyquaternium. In certain embodiments, the cationic surfactants may be polyquaterniums selected from polyquaternium-1, polyquaternium-2, polyquaternium-3, polyquaternium-4, polyquaternium-5, polyquaternium-6, polyquaternium-7, polyquaternium-8, polyquaternium-9, polyquaternium-10, polyquaternium-11, polyquaternium-12, polyquaternium-13, polyquaternium-14, polyquaternium-15, polyquaternium-16, polyquaternium-17, polyquaternium-18, polyquaternium-19, polyquaternium-20, polyquaternium-21, polyquaternium-22, polyquaternium-23, polyquaternium-24, polyquaternium-25, polyquaternium-26, polyquaternium-27, polyquaternium-28, polyquaternium-29, polyquaternium-30, polyquaternium-40, polyquaternium-41, polyquaternium-42, polyquaternium-43, polyquaternium-44, polyquaternium-45, polyquaternium-46, polyquaternium-47, polyquaternium-48, polyquaternium-49, polyquaternium-50, polyquaternium-51, polyquaternium-52, polyquaternium-53, polyquaternium-54, polyquaternium-55, polyquaternium-56, polyquaternium-57, polyquaternium-58, polyquaternium-59, polyquaternium-60, polyquaternium-61, polyquaternium-62, polyquaternium-63, polyquaternium-64, polyquaternium-65, polyquaternium-66, polyquaternium-67, etc. In some cases, preferred polyquaternium compounds include polyquaternium-10, polyquaternium-11, polyquaternium-67, and a mixture thereof.

In some embodiments, the one or more cationic polymers are chosen from cationic proteins and cationic protein hydrolysates (e.g., hydroxypropyltrimonium hydrolyzed wheat protein), quaternary diammonium polymers (e.g., hexadimethrine chloride), copolymers of acrylamide and dimethyldiallyammonium chloride, and mixtures thereof. In a preferred embodiment, the cosmetic composition includes one or more polyquaternium. In an even more preferred embodiment, the cationic polymer is polyquaternium-67.

The total amount of the one or more cationic polymers in the cosmetic composition, if present, will vary but are typically from about 0.01 to about 3 wt. %, based on the total weight of the cosmetic composition. In further embodiments, the cosmetic composition includes from about 0.01 to about 2 wt. %, about 0.01 to about 1 wt. %, about 0.05 to about 3 wt. %, about 0.05 to about 2 wt. %, about 0.05 to about 1 wt. %, about 0.1 to about 3 wt. %, about 0.1 to about 2 wt. %, about 0.1 to about 1 wt. %, based on the total weight of the cosmetic composition. Preferably, the cosmetic composition includes from about 0.01 to about 3 wt. %, about 0.05 to about 2 wt. %, about 0.1 to about 1 wt. % of the one or more cationic polymers, based on the total weight of the cosmetic composition.

pH

The pH of the cosmetic composition will vary but is typically from about 4 to about 8 or about 4 to about 7. In further embodiments, it is preferable that the pH be acidic or slightly acidic. For example, the pH may be from about 4 to less than 7, about 4.5 to less than 7, about 5 to less than 7, about 5.5 to less than 7, or about 6 to less than 7. In further embodiments, the pH is from about 4 to about 6.5, about 4 to about 6, about 4 to about 5.5, about 4 to about 5, about 4.5 to about 6.5, about 4.5 to about 6, about 4.5 to about 5.5, about 5 to about 6.5, about 5 to about 6, or about 5.5 to about 6.5. Preferably, the cosmetic composition has a pH of about 4 to about 7, more preferably about 4.5 to about 6.5, and even more preferably about 5 to about 6.

Viscosity

The viscosity of the cosmetic composition will vary. Nonetheless, the cosmetic composition typically has a viscosity similar to other facial creams, facial pastes, facial cleansers, and facial masks. In various embodiments, the cosmetic composition has a viscosity from about 100,000 cP to about 500,000 cP at 25° C. In further embodiments, the viscosity is from about 10,000 cP to about 400,000 cP, about 10,000 cP to about 300,000 cP, about 10,000 cP to about 200,000 cP, about 10,000 cP to about 10,000 cP, about 10,000 cP to about 50,000 cP, about 25,000 cP to about 500,000 cP, about 25,000 cP to about 400,000 cP, about 25,000 cP to about 300,000 cP, about 25,000 cP to about 200,000 cP, about 25,000 cP to about 100,000 cP, about 25,000 cP to about 50,000 cP, about 50,000 cP to about 500,000 cP, about 50,000 cP to about 400,000 cP, about 50,000 cP to about 300,000 cP, about 50,000 cP to about 200,000 cP or about 50,000 cP to about 100,000 cP. Preferably, the viscosity is from about 10,000 cP to about 50,000 cP at 25° C., more preferably about 20,000 cP to about 400,000 cP, and even more preferably about 50,000 cP to about 300,000 cP, and even more preferably about 100,000 to about 200,000 cP at 25° C. The viscosity can be measured with Brookfield Ameteck DV-1 Viscometer, T-F #96 Spindle, 10 rpm, 1 min.

Stability

The cosmetic composition typically does not visually phase separate and retains at least 90 wt. % of the 2-mercaptonicotinoyl glycine after 2 months in storage at 25° C. in a light resistant glass container. In further embodiments, the cosmetic composition does not visually phase separate and retains at least 91 wt. %, at least 92 wt. %, at least 93 wt. %, at least 94 wt. %, at least 95 wt. %, at least 96 wt. %, at least 97 wt. %, at least 98 wt. %, at least 99 wt. %, or at least 99.5 wt. % of the 2-mercaptonicotinoyl glycine after 2 months in storage at 25° C. in a light resistant glass container. Similarly, in various embodiments, the cosmetic composition also does not visually phase separate and retains at least 90 wt. % of the scorbic acid after 2 months in storage at 45° C. in a light resistant glass container. In further embodiments, the cosmetic composition does not visually phase separate and retains at least 91 wt. %, at least 92 wt. %, at least 93 wt. %, at least 94 wt. %, at least 95 wt. %, at least 96 wt. %, at least 97 wt. %, at least 98 wt. %, at least 99 wt. %, or at least 99.5 wt. % of the 2-mercaptonicotinoyl glycine after 2 months in storage at 45° C. in a light resistant glass container.

Improved Penetration

The cosmetic composition achieves the improved penetration of skin active agents into adult human skin, for example, improved penetration of 2-mercaptonicotinoyl glycine. For example, the cosmetic compositions may achieve penetration of the skin active agent (e.g., 2-mercaptonicotinoyl glycine) into the epidermis and dermis of skin. In some cases, the cosmetic composition may obtain about 2 µg/cm$^2$ or more, 2.1 µg/cm$^2$ or more, 2.2 µg/cm$^2$ or more, 2.3 µg/cm$^2$ or more, 2.4 µg/cm$^2$ or more, 2.5 µg/cm$^2$ or more, 2.6 µg/cm$^2$ or more, 2.7 µg/cm$^2$ or more, 2.8 µg/cm$^2$ or more, 2.9 µg/cm$^2$ or more, 3 µg/cm$^2$ or more of skin active agent (e.g., 2-mercaptonicotinoyl glycine) in the epidermis and dermis of human skin. In certain embodiments, the cosmetic compositions obtain the improved penetration of skin active agents without the use of penetration enhancers.

Some therapeutic or cosmetic compositions achieve epidermal penetration by using a skin penetration enhancing carrier or vehicle. Such carrier or vehicles (which are compounds or mixtures of compounds) are often described as "penetration enhancers" or "skin enhancers." Typical penetration enhancers, which may be optionally excluded from the cosmetic composition, include sulphoxides (such as dimethylsulphoxide, DMSO), azones (e.g., laurocapram), pyrrolidones, (for example 2-pyrrolidone, 2P), alcohols and alkanols (ethanol, or decanol), surfactants (also common in dosage forms) and terpenes. Some penetration enhancers are capable of inserting between the hydrophobic tails of the bilayer, thus disturbing their packing, increasing their fluidity and, subsequently, leading to easier diffusion of lipidlike penetrants. The inventors surprisingly discovered that certain cosmetic compositions according to the disclosure provided improved penetration of retinol and/or other skin active agents into adult human skin without using certain like penetrants.

In some cases, the cosmetic composition has 5 wt. % or less, 4 wt. % or less, 3 wt. % or less, 2 wt. % or less, or 1 wt. % or less of any one of the foregoing penetration enhancers. In at least one instance, the cosmetic composition is free of or essentially free of any one of the foregoing penetrations enhancers. Additionally or alternatively, the cosmetic composition may have about 5 wt. % or less, 4 wt. % or less, 3 wt. % or less, 2 wt. % or less, or 1 wt. % or less of a total amount of penetration enhancers. For instance, the cosmetic composition may be free of or essentially free of penetration enhancers.

The cosmetic composition may, in some cases, have 5 wt. % or less, 4 wt. % or less, 3 wt. % or less, 2 wt. % or less, or 1 wt. % or less of tocopherol. In at least one instance, the cosmetic composition is free of or essentially free of tocopherol. The cosmetic composition may have 5 wt. % or less, 4 wt. % or less, 3 wt. % or less, 2 wt. % or less, or 1 wt. % or less of ascorbyl palmitate. In at least one case, the cosmetic composition is free of or essentially free of ascorbyl palmitate.

Methods for Treating Skin

The cosmetic composition is designed for treating, hydrating, and cleansing skin, especially acne-prone skin. It has a distinctive wasabi-like paste texture and is versatile, functioning as a 3-in-1 treatment. The three applications include:
1. Daily Skin-Clearing Cleanser: The paste can be mixed with water, applied to the skin, gently rubbed in, and then rinsed off with water after a short period.
2. Overnight Drying Spot Treatment: In its original form, the composition can be applied directly to specific areas of the skin and left on for an extended period, such as overnight, before being rinsed off.
3. Face Mask: The paste can be layered onto damp skin and retained for a designated period before rinsing off, allowing for deeper treatment.

The multifunctional nature of the cosmetic composition and its wide utility can dictate how the composition is used. The composition's versatility as a cleanser, spot treatment, or mask offers a convenient and effective solution for managing acne-prone skin. Accordingly, the composition is particularly useful in methods for treating, hydrating, and cleansing skin, especially acne-prone skin. Alternatively, or additionally, the composition is useful in methods for depigmenting skin, brightening skin, treating hyperpigmentation of skin, treating melasmic skin, evening skin tone, or a combination thereof.

In various embodiments, the composition is used in methods for cleansing skin. The composition may be applied to the skin in combination with water, gently rubbed onto or into the skin, and then rinsed and rinsed from the skin with water after a short period. The composition can be used intermittently as needed or regularly, for example, as a daily cleanser. In preferred embodiments, the skin to be treated or cleansed is an area of the skin in need of treatment or cleansing, for example, skin that is suffering from acne or is acne-prone, skin in need of brightening, skin in need of depigmenting, skin suffering from hyperpigmentation, melasmic skin, or skin with an uneven skin tone.

In further embodiments, the composition is used in methods for overnight treatment of skin. The composition may be selectively applied to skin and allowed to remain on the skin overnight and then rinsed from the skin with water. The composition is typically applied to areas of the skin in need of treatment, for example, skin that is suffering from acne or is acne-prone, skin in need of brightening, skin in need of depigmenting, skin suffering from hyperpigmentation, melasmic skin, or skin with an uneven skin tone.

In further embodiments, the composition is as a rinse-off mask, in particular, a rinse-off facial mask. The mask is useful for delivering active agents to the skin, in particular, ascorbic acid. The composition is typically applied as a thick, even layer onto clean, damp skin. It remains on the face for a designated amount of time, usually ranging from 5 to 20 minutes, allowing the active ingredients to interact with the skin. During this time, the mask may form a semi-dry or stable layer. Once the treatment time is complete, the mask is rinsed away with water. This method helps to remove impurities, dead skin cells, and excess oil while leaving the beneficial effects of the active ingredients on the skin. In preferred embodiments, the skin to be treated is the skin of the face in need of treatment, for example, skin that is suffering from acne or is acne-prone, skin in need of brightening, skin in need of depigmenting, skin suffering from hyperpigmentation, melasmic skin, or skin with an uneven skin tone.

PREFERRED EMBODIMENTS

In a preferred embodiment, the cosmetic composition comprises, consists essentially of, or consists of:
(a) about 0.05 to about 5, preferably about 0.1 to about 3 wt. %, more preferably about 0.1 to about 1 wt. % of 2-mercaptonicotinoyl glycine;
(b) about 5 to about 25 wt. %, preferably about 6 to about 20 wt. %, and more preferably about 8 to about 15 wt. % of one or more acyl glycinate surfactants, wherein the one or more glycinate surfactants are preferably selected from sodium cocoyl glycinate, sodium lauroyl glycinate, sodium myristoyl glycinate, potassium lauroyl glycinate, potassium cocoyl glycinate, or a combination thereof, and wherein, more preferably, the one or more glycinate surfactants comprises, consists essentially of, or consists of sodium cocoyl glycinate;
(c) about 0.05 to about 5 wt. %, preferably about 0.1 to about 3 wt. %, and more preferably about 0.2 to about 1 wt. % of one or more salts providing divalent cations having a charge density of about 40 to about 200 C/mm3 and a water solubility of at least 400 g/L, wherein the one or more salts are preferably selected from magnesium salts, calcium salts, or a combination thereof, and wherein, more preferably, the one or more salts are selected from magnesium chloride, calcium chloride, magnesium sulfate, magnesium thiosulfate, calcium sulfate, calcium thiosulfate, magnesium pyrrolidone carboxylate (magnesium pidolate), zinc sulfate, calcium pyrrolidone carboxylate (calcium pidolate), magnesium gluconate, or a combination thereof;
(d) about 0.5 to about 6 wt. %, preferably about 0.8 to about 5 wt. %, and more preferably about 1 to about 3 wt. % of one or more anionic polymers, wherein the one or more anionic polymers are preferably copolymers of two or more monomers selected from acrylic acid, methacrylic acid, vinyl monomers, and (meth) acrylamide, wherein even more preferably, the one or more anionic polymers comprises, consists essentially of, or consists of acrylates copolymer;

(e) about 30 to about 60 wt. %, preferably about 35 to about 55 wt. %, and more preferably about 40 to about 50 wt. % of glycerin;

(f) about 15 to about 50 wt. %, preferably about 25 to about 50 wt. %, and more preferably about 30 to about 45 wt. % of water; and (g) about 0.05 to about 5 wt. %, preferably about 0.1 to about 3 wt. %, and more preferably about 0.2 to about 1 wt. % of one or more reducing agents, wherein the one or more reducing agents is preferably a sulfur-containing reducing agent, wherein more preferably, the one or more sulfur containing reducing agents are selected from alkaline-earth metal sulfites, sulfites, thiol-based compounds, salts thereof, or combinations thereof, and even more preferably, wherein preferably, the thiol-based compounds are selected from thiolactic acid, glycerol monothiolactate, ammonium thiolactate, MEA-thiolactate, 3-mercaptopropionic acid, glycerol 3-mercaptopropionate, ethyleneglycol 3-mercaptopropionate, cysteamine, N-acetylcysteamine, N-propionylcysteamine, cysteine, N-acetylcysteine, N-alkanoylcysteine, cysteine alkyl esters, homocysteine, thioglycolic acid, ethanolamine thioglycolate, glyceryl thioglycolate, glutathione, thioglycerol, thiomalic acid, thiodiglycol, 2-mercaptoethanol, dithiothreitol, thioxanthine, thiosalicylic acid, thiopropionic acid, lipoic acid, and combinations thereof, and wherein even more preferably, the one or more reducing agents are selected from ammonium thioglycolate, L-cysteine, N-acetyl L-cysteine, glutathione, ascorbic acid, beta-mercaptoethanol, 2-mercaptoethylamine, 2-mercaptoethylamine hydrochloride, dithiothreitol (DTT), thiolactic acid, thiosalicylic acid, tris-2-carboxyethylphospine hydrochloride (TCEP), sodium hydrosulfite, sodium thiosulfate, potassium disulfite, sodium disulfite, sodium bisulfate, sodium bisulfite, ammonium bisulfite, calcium thioglycolate, potassium thioglycolate, sodium thioglycolate, cysteine hydrochloride, thioglycerin, mercaptopropionic acid, glycerol thioglycolate, and dithiolbutylamine (DTBA), or combinations thereof; and wherein even more preferably, the one or more reducing agents comprises, consists essentially of, or consists of sodium thiosulfate;

(h) optionally, about 0.01 to about 8 wt. %, preferably about 0.1 to about 5 wt. %, and more preferably about 1 to about 4 wt. % or one or more nonionic emulsifiers, wherein the one or more nonionic emulsifiers preferably have a Hydrophilic-Lipophilic (HLB) of about 6 or less;

(i) optionally, one or more skin active agents;

(j) optionally, one or more humectants selected from glycols having from 2 to about 10 carbon atoms; and (k) optionally, one or more miscellaneous ingredients; wherein all percentages by weight are based on a total weight of the composition;

wherein the composition preferably has a pH from about 4 to about 7, more preferably from about 4.5 to about 6.5, and even more preferably from about 5.5 to about 6.5;

wherein, preferably, (c) and (d) are in a weight ratio of about 1.5:1 to about 1:5, preferably about 1:1 to about 1:4, and even more preferably about 1:2 to about 1:4 ((c):(d)) and/or (e) and (f) are in a weight ratio of about 2:1 to about 1:2, about 2:1 to about 1:1.5, more preferably about 2:1 to about 1:1, and even more preferably about 1.8:1 to about 1.1:1 ((e):(f)) ((e):(f));

wherein, preferably, the composition has a lamellar liquid crystal structure;

wherein, preferably, the composition has a viscosity of about 25,000 cP to about 300,000 cP, preferably from about 50,000 cP to about 250,000 cP, more preferably about 100,000 cP to about 200,000 cP at 25° C. and a shear rate of 1 s$^{-1}$; and wherein, preferably, the composition retains at least 90 wt. % of the 2-mercaptonicotinoyl glycine after 2 month in storage at 25° C. in a light resistant glass container.

In a preferred embodiment, the cosmetic composition comprises, consists essentially of, or consists of:

(a) about 0.05 to about 5, preferably about 0.1 to about 3 wt. %, more preferably about 0.1 to about 1 wt. %, and even more preferably about 0.2 to about 0.6 wt. % of 2-mercaptonicotinoyl glycine;

(b) about 5 to about 25 wt. %, preferably about 6 to about 20 wt. %, and more preferably about 8 to about 15 wt. % of one or more acyl glycinate surfactants, wherein the one or more glycinate surfactants are preferably selected from sodium cocoyl glycinate, sodium lauroyl glycinate, sodium myristoyl glycinate, potassium lauroyl glycinate, potassium cocoyl glycinate, or a combination thereof, and wherein, more preferably, the one or more glycinate surfactants comprises, consists essentially of, or consists of sodium cocoyl glycinate;

(c) about 0.05 to about 5 wt. %, preferably about 0.1 to about 3 wt. %, and more preferably about 0.2 to about 1 wt. %, and even more preferably about 0.3 to about 0.8 wt. % of one or more salts providing divalent cations having a charge density of about 40 to about 200 C/mm3 and a water solubility of at least 400 g/L, wherein the one or more salts are preferably selected from magnesium salts, calcium salts, or a combination thereof, and wherein, more preferably, the one or more salts are selected from magnesium chloride, calcium chloride, magnesium sulfate, magnesium thiosulfate, calcium sulfate, calcium thiosulfate, magnesium pyrrolidone carboxylate (magnesium pidolate), zinc sulfate, calcium pyrrolidone carboxylate (calcium pidolate), magnesium gluconate, or a combination thereof;

(d) about 0.5 to about 6 wt. %, preferably about 0.8 to about 5 wt. %, and more preferably about 1 to about 3 wt. %, and even more preferably, about 1 to about 2 wt. % of one or more anionic polymers selected from copolymers of two or more monomers selected from acrylic acid, methacrylic acid, vinyl monomers, and (meth)acrylamide, wherein preferably, the one or more anionic polymers comprises, consists essentially of, or consist of acrylates copolymer;

(e) about 30 to about 60 wt. %, preferably about 35 to about 55 wt. %, and more preferably about 40 to about 50 wt. % of glycerin;

(f) about 15 to about 50 wt. %, preferably about 25 to about 50 wt. %, and more preferably about 30 to about 45 wt. % of water; and (g) about 0.05 to about 5 wt. %, preferably about 0.1 to about 3 wt. %, and more preferably about 0.2 to about 1 wt. % of one or more reducing agents, wherein the one or more reducing agents is preferably a sulfur-containing reducing agent, wherein more preferably, the one or more sulfur containing reducing agents are selected from alkaline-earth metal sulfites, sulfites, thiol-based compounds, salts thereof, or combinations thereof, and even more preferably, wherein preferably, the thiol-based compounds are selected from thiolactic acid, glycerol monothiolactate, ammonium thiolactate, MEA-thiolactate, 3-mercaptopropionic acid, glycerol 3-mercaptopropionate, ethyleneglycol 3-mercaptopropionate, cysteamine, N-acetylcysteamine, N-propionylcysteamine, cysteine, N-acetylcysteine, N-alkanoyl-cysteine, cysteine alkyl esters, homocysteine, thioglycolic acid, ethanolamine thioglycolate, glyceryl thioglycolate, glutathione, thioglycerol, thiomalic acid, thiodiglycol, 2-mercaptoethanol, dithiothreitol, thioxanthine, thiosalicylic acid, thiopropionic acid, lipoic acid, and combinations thereof, and wherein even more preferably, the one or more reducing agents are selected from ammonium thioglycolate, L-cysteine, N-acetyl L-cysteine, glutathione, ascorbic acid, beta-mercaptoethanol, 2-mercaptoethylamine, 2-mercaptoethylamine hydrochloride, dithiothreitol (DTT), thiolactic acid, thiosalicylic acid, tris-2-carboxyethylphospine hydrochloride (TCEP), sodium hydrosulfite, sodium thiosulfate, potassium disulfite, sodium disulfite, sodium bisulfate, sodium bisulfite, ammonium bisulfite, calcium thioglycolate, potassium thioglycolate, sodium thioglycolate, cysteine hydrochloride, thioglycerin, mercaptopropionic acid, glycerol thioglycolate, and dithiolbutylamine (DTBA), or combinations thereof; and wherein even more preferably, the one or more reducing agents comprises, consists essentially of, or consists of sodium thiosulfate;

(h) optionally, about 0.01 to about 8 wt. %, preferably about 0.1 to about 5 wt. %, and more preferably about 1 to about 4 wt. % or one or more nonionic emulsifiers, wherein the one or more nonionic emulsifiers preferably have a Hydrophilic-Lipophilic (HLB) of about 6 or less, wherein preferably, the one or more nonionic emulsifiers comprises, consists essentially of, or consists of one or more glycol esters, glycerol esters, or a combination thereof, for example, glycol distearate, glycol hydroxystearate, glycol oleate, glycol ricinoleate, glycol stearate, propylene glycol isostearate, propylene glycol hydroxystearate, propylene glycol laurate, propylene glycol myristate, propylene glycol oleate, propylene glycol ricinioleate, propylene glycol stearate, diglyceryl polyacyladipate-2, glyceryl behenate, glyceryl erucate, glyceryl hydroxystearate, glyceryl isostearate, glyceryl lanolate, glyceryl laurate, glyceryl linoleate, glyceryl myristate, glyceryl oleate, glyceryl palmitate lactate, glyceryl sesquioleate, glyceryl stearate, citrate, glyceryl dioleate, glyceryl distearate, glyceryl laurate, or a combination thereof. In at least one instance the glyceryl ester comprises glyceryl stearate, bis-diglyceryl polyacyladipate, glyceryl ricinoleate, or a combination thereof;

(i) optionally, about 0.01 to about 10 wt. %, preferably about 0.1 to about 8 wt. %, more preferably about 0.5 to about 6 wt. % of one or more skin active agents, wherein preferably, the one or more skin active agents are selected from antioxidants, depigmenting agents, anti-wrinkle agents, photoprotective agents, self-tanning agents, desquamating agents, moisturizing agents, anti-aging ingredients, and mixtures thereof;

(j) optionally, about 0.01 to about 10 wt. %, more preferably about 0.1 to about 8 wt. %, and even more preferably about 0.5 to about 5 wt. % of one or more humectants selected from glycols having from 2 to about 10 carbon atoms; and (k) optionally, about 0.01 to about 5 wt. % of one or more miscellaneous ingredients, wherein the one or more miscellaneous ingredients are preferably selected from preservatives, fragrances, pH adjusters, salts, chelating agents, skin active ingredients, buffers, antioxidants, flavonoids, de-pigmenting agents, anti-wrinkle agents, vitamins, botanical extracts, UV filtering agents, proteins, protein hydrolysates and/or isolates, fillers (e.g., organic and/or inorganic fillers such as talc, calcium carbonate, silica, etc.), composition colorants, or combinations thereof;

wherein all percentages by weight are based on a total weight of the composition;

wherein the composition preferably has a pH from about 4 to about 7, more preferably from about 4.5 to about 6.5, and even more preferably from about 5.5 to about 6.5;

wherein, preferably, (c) and (d) are in a weight ratio of about 1.5:1 to about 1:5, preferably about 1:1 to about 1:4, and even more preferably about 1:2 to about 1:4 ((c):(d)) and/or (e) and (f) are in a weight ratio of about 2:1 to about 1:2, about 2:1 to about 1:1.5, more preferably about 2:1 to about 1:1, and even more preferably about 1.8:1 to about 1.1:1 ((e):(f)) ((e):(f));

wherein, preferably, the composition has a lamellar liquid crystal structure;

wherein, preferably, the composition has a viscosity of about 25,000 cP to about 300,000 cP, preferably from about 50,000 cP to about 250,000 cP, more preferably about 100,000 cP to about 200,000 cP at 25° C. and a shear rate of 1 s$^{-1}$; and wherein, preferably, the composition retains at least 90 wt. % of the 2-mercaptonicotinoyl glycine after 2 month in storage at 25° C. in a light resistant glass container.

In a preferred embodiment, the cosmetic composition comprises, consists essentially of, or consists of:

(a) about 0.05 to about 5, preferably about 0.1 to about 3 wt. %, more preferably about 0.1 to about 1 wt. %, and even more preferably about 0.2 to about 0.8 wt. % of 2-mercaptonicotinoyl glycine;

(b) about 5 to about 25 wt. %, preferably about 6 to about 20 wt. %, and more preferably about 8 to about 15 wt. % of sodium cocoyl glycinate;

(c) about 0.05 to about 5 wt. %, preferably about 0.1 to about 3 wt. %, and more preferably about 0.2 to about 1 wt. %, and even more preferably about 0.3 to about 0.8 wt. % of one or more salts providing divalent cations having a charge density of about 40 to about 200 C/mm3 and a water solubility of at least 400 g/L, wherein the one or more salts are selected from magnesium salts, calcium salts, or a combination thereof, and wherein, more preferably, the one or more salts are selected from magnesium chloride, calcium chloride, magnesium sulfate, magnesium thiosulfate, calcium sulfate, calcium thiosulfate, magnesium pyrrolidone carboxylate (magnesium pidolate), zinc sulfate, calcium pyrrolidone carboxylate (calcium pidolate), magnesium gluconate, or a combination thereof, wherein more preferably, the one or more salts comprise, consists essentially of, or consist of magnesium chloride;

(d) about 0.5 to about 6 wt. %, preferably about 0.8 to about 5 wt. %, and more preferably about 1 to about 3 wt. %, and even more preferably about 1 to about 2 wt. % of acrylates copolymer;

(e) about 30 to about 60 wt. %, preferably about 35 to about 55 wt. %, and more preferably about 40 to about 50 wt. % of glycerin;

(f) about 15 to about 50 wt. %, preferably about 25 to about 50 wt. %, and more preferably about 30 to about 45 wt. % of water; and (g) about 0.05 to about 5 wt. %, preferably about 0.1 to about 3 wt. %, and more preferably about 0.2 to about 1 wt. % of one or more reducing agents, wherein the one or more reducing agents is preferably a sulfur-containing reducing agent, wherein more preferably, the one or more sulfur containing reducing agents are selected from alkaline-earth metal sulfites, sulfites, thiol-based compounds, salts thereof, or combinations thereof, the thiol-based compounds are selected from thiolactic acid, glycerol monothiolactate, ammonium thiolactate, MEA-thiolactate, 3-mercaptopropionic acid, glycerol 3-mercaptopropionate, ethyleneglycol 3-mercaptopropionate, cysteamine, N-acetylcysteamine, N-propionylcysteamine, cysteine, N-acetylcysteine, N-alkanoylcysteine, cysteine alkyl esters, homocysteine, thioglycolic acid, ethanolamine thioglycolate, glyceryl thioglycolate, glutathione, thioglycerol, thiomalic acid, thiodiglycol, 2-mercaptoethanol, dithiothreitol, thioxanthine, thiosalicylic acid, thiopropionic acid, lipoic acid, and combinations thereof, and wherein even more preferably, the one or more reducing agents are selected from ammonium thioglycolate, L-cysteine, N-acetyl L-cysteine, glutathione, ascorbic acid, beta-mercaptoethanol, 2-mercaptoethylamine, 2-mercaptoethylamine hydrochloride, dithiothreitol (DTT), thiolactic acid, thiosalicylic acid, tris-2-carboxyethylphospine hydrochloride (TCEP), sodium hydrosulfite, sodium thiosulfate, potassium disulfite, sodium disulfite, sodium bisulfate, sodium bisulfite, ammonium bisulfite, calcium thioglycolate, potassium thioglycolate, sodium thioglycolate, cysteine hydrochloride, thioglycerin, mercaptopropionic acid, glycerol thioglycolate, and dithiolbutylamine (DTBA), or combinations thereof; and wherein even more preferably, the one or more reducing agents comprises, consists essentially of, or consists of sodium thiosulfate;

(h) optionally, about 0.01 to about 8 wt. %, preferably about 0.1 to about 5 wt. %, and more preferably about 1 to about 4 wt. % or one or more nonionic emulsifiers, wherein the one or more nonionic emulsifiers preferably have a Hydrophilic-Lipophilic (HLB) of about 6 or less, wherein preferably, the one or more nonionic emulsifiers comprises, consists essentially of, or consists of one or more glycol esters, glycerol esters, or a combination thereof, for example, glycol distearate, glycol hydroxystearate, glycol oleate, glycol ricinoleate, glycol stearate, propylene glycol isostearate, propylene glycol hydroxystearate, propylene glycol laurate, propylene glycol myristate, propylene glycol oleate, propylene glycol ricinioleate, propylene glycol stearate, diglyceryl polyacyladipate-2, glyceryl behenate, glyceryl erucate, glyceryl hydroxystearate, glyceryl isostearate, glyceryl lanolate, glyceryl laurate, glyceryl linoleate, glyceryl myristate, glyceryl oleate, glyceryl palmitate lactate, glyceryl sesquioleate, glyceryl stearate, citrate, glyceryl dioleate, glyceryl distearate, glyceryl laurate, or a combination thereof. In at least one instance the glyceryl ester comprises glyceryl stearate, bis-diglyceryl polyacyladipate, glyceryl ricinoleate, or a combination thereof;

(i) optionally, about 0.01 to about 10 wt. %, preferably about 0.1 to about 8 wt. %, more preferably about 0.5 to about 6 wt. % of one or more skin active agents, wherein preferably, the one or more skin active agents are selected from antioxidants, depigmenting agents, anti-wrinkle agents, photoprotective agents, self-tanning agents, desquamating agents, moisturizing agents, anti-aging ingredients, and mixtures thereof, and wherein more preferably, the one or more skin active agents are selected from niacinamide, alpha hydroxy acids, beta hydroxy acids, polyhydroxy acids, or combinations thereof;

(j) optionally, about 0.01 to about 10 wt. %, more preferably about 0.1 to about 8 wt. %, and even more preferably about 0.5 to about 5 wt. % of one or more humectants selected from glycols having from 2 to about 10 carbon atoms; and (k) optionally, about 0.01 to about 5 wt. % of one or more miscellaneous ingredients, wherein the one or more miscellaneous ingredients are preferably selected from preservatives, fragrances, pH adjusters, salts, chelating agents, skin active ingredients, buffers, antioxidants, flavonoids, de-pigmenting agents, anti-wrinkle agents, vitamins, botanical extracts, UV filtering agents, proteins, protein hydrolysates and/or isolates, fillers (e.g., organic and/or inorganic fillers such as talc, calcium carbonate, silica, etc.), composition colorants, or combinations thereof;

wherein all percentages by weight are based on a total weight of the composition;

wherein the composition preferably has a pH from about 4 to about 7, more preferably from about 4.5 to about 6.5, and even more preferably from about 5.5 to about 6.5;

wherein, preferably, (c) and (d) are in a weight ratio of about 1.5:1 to about 1:5, preferably about 1:1 to about 1:4, and even more preferably about 1:2 to about 1:4 ((c):(d)) and/or (e) and (f) are in a weight ratio of about 2:1 to about 1:2, about 2:1 to about 1:1.5, more preferably about 2:1 to about 1:1, and even more preferably about 1.8:1 to about 1.1:1 ((e):(f)) ((e):(f));

wherein, preferably, the composition has a lamellar liquid crystal structure;

wherein, preferably, the composition has a viscosity of about 25,000 cP to about 300,000 cP, preferably from about 50,000 cP to about 250,000 cP, more preferably about 100,000 cP to about 200,000 cP at 25° C. and a shear rate of 1 s$^{-1}$; and wherein, preferably, the composition retains at least 90 wt. % of the 2-mercaptonicotinoyl glycine after 2 month in storage at 25° C. in a light resistant glass container.

EXAMPLES

Various changes can be made in the above-compositions and methods without departing from the scope of the invention. Accordingly, it is intended that the entire disclosure in the above description and in the examples given below, is illustrative and not limiting.

Example 1

Inventive Compositions

|     |                         |                                      | A   | B   |
| --- | ----------------------- | ------------------------------------ | --- | --- |
| (a) | Thio-pyridonone Compound | 2-MERCAPTO-NICOTINOYL GLYCINE | 0.3 | 0.5 |

-continued

|     |                         |                          | A      | B      |
|-----|-------------------------|--------------------------|--------|--------|
| (b) | Acyl Glycinate Surfactant | SODIUM COCOYL GLYCINATE | 9.6    | 9.6    |
| (c) | Divalent Cation         | MAGNESIUM CHLORIDE       | 0.5    | 0.5    |
| (d) | Anionic Polymer         | ACRYLATES COPOLYMER      | 1.2    | 1.2    |
| (e) | Glycerin                | GLYCERIN (QS to 100%)    | QS to 100% | |
| (f) | Water                   | WATER                    | 35.4   | 35.4   |
| (g) | Reducing agent          | SODIUM THIOSULFATE       | 0.25   | 0.25   |
| (h) | Low-HLB Emulsifier      | GLYCOL DISTEARATE        | 3      | 3      |
| (i) | Skin Active Agents      | NIACINAMIDE              | 2      | 2      |
|     |                         | SALICYLIC ACID           | 0.5    | 0.5    |
|     |                         | LACTIC ACID              | 1      | 1      |
| (j) | Miscellaneous[1]        |                          | ≤5     | ≤5     |
|     | Total %                 |                          | 100    | 100    |
|     | Bulk Appearance         |                          | Pale yellow, thick paste | Pale yellow, thick paste |
|     | Stability at 45° C, for 8 weeks [2] |              | Yes    | Yes    |
|     | pH                      |                          | 6.0    | 6.0    |
|     | Viscosity [3] (cP)      |                          | 178,000 | 185,000 |
|     | ≥90% 2-mercaptonicotinoyl glycine remained after 8 weeks at 45° C. | | Yes | Yes |

[1] For example, pH adjusters, salts, fragrances, preservatives, antioxidants, UV filters, de-pigmenting agents, chelating agents, compositions colorants, fillers, humectants, emollients, botanical extracts, amino acids, peptides, proteins, or combinations thereof.
[2] Stability of pH and viscosity were assessed. The integrity of the compositions was also visually assessed. The pH and viscosity of stable compositions did not vary by more than 10%. Also, stable compositions did not phase separate or form particulates.
[3] Brookfield Ameteck DV-1 Viscometer, T-F #96 Spindle, 10 rpm, 1 min Example 2

Comparative Compositions

|     |                   |                              | A      | COMPARATIVE 1 | 2      | 3      | 4      | 5      | 6      |
|-----|-------------------|------------------------------|--------|---|--------|--------|--------|--------|--------|
| (a) | Active            | 2-MERCAPTONICOTINOYL GLYCINE | 0.3    | 0.3 | 0.3    | 0.3    | 0.3    | 0.3    | 0.3    |
| (b) | Glycinate         | SODIUM COCOYL GLYCINATE      | 9.6    |   |        |        | 9.6    | 9.6    | 9.6    |
|     | Glutamate         | SODIUM COCOYL GLUTAMATE      |        | 9.6 |        |        |        |        |        |
|     | Isethionate       | SODIUM COCOYL ISETHIONATE    |        |   | 9.6    |        |        |        |        |
|     | Sulfosuccinate    | DISODIUM LAURETH SULFOSUCCINATE |     |   |        | 9.6    |        |        |        |
| (c) | Divalent Cation   | MAGNESIUM CHLORIDE           | 0.5    | 0.5 | 0.5    | 0.5    |        | 0.5    | 1      |
|     | Monovalent Cation | SODIUM CHLORIDE              |        |   |        |        | 0.5    |        |        |
| (d) | Anionic Polymer   | ACRYLATES COPOLYMER          | 1.2    | 1.2 | 1.2    | 1.2    | 1.2    |        | 2.4    |
|     | Nonionic Thicker  | GUAR GUM, XANTHAN GUM, HYDROXYETHYL CELLULOSE, CARBOMER | | | | | | 1.2 | |
| (e) | Glycerin          | GLYCERIN (QS to 100%)        | 45.2   | 45.2 | 45.2  | 45.2   | 45.2   | 45.2   | 25.2   |
| (f) | Water             | WATER                        | 35.4   | 35.4 | 35.4  | 35.4   | 35.4   | 35.4   | 55.4   |
| (g) | Reducing Agent    | SODIUM THIOSULFATE           | 0.3    | 0.3 | 0.3    | 0.3    | 0.3    | 0.3    | 0.3    |
| (h) | Emulsifier        | GLYCOL DISTEARATE            | 3      | 3 | 3      | 3      | 3      | 3      | 3      |
| (i) | Skin Active Agents | NIACINAMIDE                 | 2      | 2 | 2      | 2      | 2      | 2      | 2      |
|     |                   | SALICYLIC ACID               | 0.5    | 0.5 | 0.5    | 0.5    | 0.5    | 0.5    | 0.5    |
|     |                   | LACTIC ACID                  | 1      | 1 | 1      | 1      | 1      | 1      | 1      |
| (i) | Miscellaneous [1] |                              | ≤5     | ≤5 | ≤5     | ≤5     | ≤5     | ≤5     | ≤5     |
|     | Total %           |                              | 100    | 100 | 100   | 100    | 100    | 100    | 100    |
|     | Bulk Appearance   |                              | Thick paste | Soft cream | Soft cream | Soft cream | Milk | Soft cream | Soft cream |
|     | Stable at 45° C. for 8 weeks [2] |               | Yes    | No | No     | No     | No     | No     | No     |
|     | pH                |                              |        |   |        | 5.7~6.3 |       |        |        |
|     | Viscosity [3] (cP) |                             | 178,000 | 17,500 | 17,000 | 18,500 | 7,500 | 16,000 | 15,000 |
|     | ≥90% 2-mercaptonicotinoyl glycine remained after 8 weeks at 45° C. | | Yes | No | No | No | No | No | No |

[1] For example, pH adjusters, salts, fragrances, preservatives, antioxidants, UV filters, de-pigmenting agents, chelating agents, compositions colorants, fillers, humectants, emollients, botanical extracts, amino acids, peptides, proteins, or combinations thereof.
[2] Stability of pH and viscosity were assessed. The integrity of the compositions was also visually assessed. The pH and viscosity of stable compositions did not vary by more than 10%. Also, stable compositions did not phase separate or form particulates.
[3] Brookfield Ameteck DV-1 Viscometer, T-F #96 Spindle, 10 rpm, 1 min The results for composition A and compositions 1-3 demonstrate that using anionic surfactants other than sodium cocoyl glycinate resulted in compositions that did not thicken properly, were unstable, and failed to retain at least 90% of 2-mercaptonicotinoyl glycine. Similarly, the results for composition A and composition 4 indicate that the absence of a divalent cation caused composition 4 to fail in thickening properly, become unstable, and retain less than 90% of 2-mercaptonicotinoyl glycine. The results for composition A and composition 5 reveal that the absence of an anionic polymer led to improper thickening, instability, and a failure to retain at least 90% of 2-mercaptonicotinoyl glycine. Finally, the data for composition A and composition 6 show that without a threshold amount of glycerin, the composition (composition 6) failed to thicken properly, became unstable, and retained less than 90% of 2-mercaptonicotinoyl glycine.

Example 3

Skin Depigmentation Study

A clinical study with 2 groups was carried out in India with 35 female participants, aged 18-50 with mixed skin types, in each group. Each participant must have at least 2 well defined dark spots of post inflammatory hyperpigmentation (PIH) on either side of face for at least 14 days. Density of pigmentary spots, contrast of isolated pigmentary spots and skin unevenness was determined by L'Oréal Indian Aging Atlas, Volume 4, at greater than Grade 3. Participants must not be SPF product users and should be regular users of cleansers and cleansing masks.

Following a 14-day washout period, each participant was given a test product (or products) to use at home for 28 days. The results were assessed by image analysis using spectrophotometer CM-2600d, and by expert clinical grading on Day 0, Day 7, Day 14, Day 21 and Day 28.

Participants of group 1 were given Composition A of Example 1 to use twice daily. The test product was used as a face wash every morning and evening. In addition, the test product was used as a treatment on dark spots overnight, and twice a week as a 10-min rinse-off mask.

Participants in group 2 were given two commercial benchmark products that are used and marketed in a skin brightening routine: a face cleanser and a face serum. The face cleanser was used every morning and evening. In addition, the face serum was used as a treatment product after the face wash in the evening.

Expert clinical grading, instrumental evaluation and image analysis on the final study results were carried out on the following attributes: 1. contrast of spots, 2. density of spots and skin evenness, 3.3-mm PIH spot lightening L* and undertone b*, and 4. Global brightening and skin smoothness.

Both treatment groups experienced skin brightening benefit compared to the baseline in as short as 7 days, and that there is no statistical difference the results from group 1 and group 2 during the four-week study. In other words, the use of Composition A of Example 1 provides the same or similar clinical efficacy on overall skin brightening effect comparing to that of a skin care routine (a face cleanser and a face serum) used and marketed as a skin brightening product.

The foregoing disclosure illustrates and describes embodiments of the invention. The disclosure shows and describes only the preferred embodiments, but it is understood that the invention is useable in various other combinations, modifications, and environments and is capable of changes or modifications within the scope of the inventive concepts expressed herein, commensurate with the above teachings and/or the skill or knowledge of the relevant art. The embodiments described above are further intended to explain best modes known by applicant and to enable others skilled in the art to utilize the disclosure. This description is not intended to limit the invention.

As used herein, the terms "comprising," "having," and "including" (or "comprise," "have," and "include") are used in their open, non-limiting sense. The phrase "consisting essentially of" limits the scope of a claim to the specified materials or steps and those that do not materially affect the basic and novel characteristics of the claimed invention.

The terms "a," "an," and "the" are understood to encompass the plural as well as the singular.

Thus, the term "a mixture thereof" or "a combination thereof" also relates to "mixtures thereof" or "combinations thereof." Throughout the disclosure, the term "a combination thereof" may be used following a list of elements as shown in the following example where letters A-F represent the elements: "one or more elements selected from A, B, C, D, E, F, or combination thereof." The term, "combination thereof" does not require that the combination include all of A, B, C, D, E, and F (although all of A, B, C, D, E, and F may be included). Rather, it indicates that a combination of any two or more of A, B, C, D, E, and F can be included. In other words, it is equivalent to the phrase "one or more elements selected from A, B, C, D, E, F, and a combination of any two or more of A, B, C, D, E, and F."

Likewise, the term "a salt thereof" also relates to "salts thereof." Thus, where the disclosure refers to "an element selected from the group consisting of A, B, C, D, E, F, a salt thereof, and a combination thereof," it indicates that that one or more of A, B, C, D, and F may be included, one or more of a salt of A, a salt of B, a salt of C, a salt of D, a salt of E, and a salt of F may be include, or a mixture of any two of A, B, C, D, E, F, a salt of A, a salt of B, a salt of C, a salt of D, a salt of E, and a salt of F may be included.

All percentages, parts and ratios herein are based upon the total weight of the compositions of the present disclosure, unless otherwise indicated.

The compositions and methods of the present disclosure can comprise, consist of, or consist essentially of the essential elements and limitations of the disclosure described herein, as well as any additional or optional ingredients, components, or limitations described herein or otherwise useful.

The surfactants referred to throughout the disclosure may include those having a counter-ion such as an alkali metal, alkaline earth metal, or ammonium counterion. This list of counterions, however, is non-limiting. Regardless of whether the possibility of a salt for a particular component is mentioned, both the salt and the non-salt form of the component are intended, unless stated otherwise.

The expression "one or more" means "at least one" and thus includes individual components as well as mixtures/combinations.

The term "plurality" means "more than one" or "two or more."

Other than in the operating examples, or where otherwise indicated, all numbers expressing quantities of ingredients and/or reaction conditions can be modified in all instances by the term "about," meaning within +/−10% of the indicated number. For example, an amount of "about 1 wt." can include an amount as low as 0.90 wt. % or as high as 1.1. Similarly, an amount of "about 50" can include an amount as low as 45 wt. % and as high as 55 wt. %.

The term "transparent" with respect to a transparent composition indicates that the composition has transmittance of at least 80% at a wavelength of 600 nm, for example measured using a Lambda 40 UV-visible spectrometer. The compositions may have, for example, a transmittance of at least 80%, at least 90%, or at least 95% at a wavelength of 600 nm, measured, for example, using a Lambda 40 UV-visible spectrometer. The term "clear" is interchangeable with the term "transparent" for purposes of the instant disclosure. A human can typically see through a transparent composition, for example, and read the text on the other side of a clear glass or clear plastic bottle containing the composition.

The term "translucent" with respect to a translucent composition indicates that the composition has a transmittance of at least 50% at a wavelength of 600 nm, for example measured using a Lambda 40 UV-visible spectrometer. A human cannot likely see through a translucent composition, for example, and read the text on the other side of a clear glass or clear plastic bottle containing the composition. Rather, the text is usually blurred and difficult or not possible to read, yet movement and structure can normally be identified.

The term "opaque" with respect to an opaque composition indicates that the composition is not transparent or translucent, i.e., has a transmittance of less than 50% at a wavelength of 600 nm, for example measured using a Lambda 40 UV-visible spectrometer.

Some of the various categories of components identified may overlap. In such cases where overlap may exist and the composition includes both components (or the composition includes more than two components that overlap), an overlapping component or ingredient does not represent more than one element of the claims. For example, if a polyacrylate falls within the description of a thickening polymer and within the description of film forming polymer, a single polyacrylate is understood as being only the thickening polymer or only the film forming polymer. A single polyacrylate cannot simultaneously be construed as both a thickening polymer and a film forming polymer in the same composition, for example, when the claims set forth both a thickening polymer and a film forming polymer (even though the polyacrylate may function as both a thickening polymer and a film forming polymer). In other words, a single compound or ingredient cannot simultaneously serve as two different components or elements of a claim.

All ranges and values disclosed herein are inclusive and combinable. For examples, any value or point described herein that falls within a range described herein can serve as a minimum or maximum value to derive a sub-range, etc. Furthermore, all ranges provided are meant to include every specific range within, and combination of sub-ranges between, the given ranges. Thus, a range from 1-5, includes specifically 1, 2, 3, 4 and 5, as well as sub ranges such as 2-5, 3-5, 2-3, 2-4, 1-4, etc.

All components positively set forth in the instant disclosure can be negatively excluded from the claims and from the compositions and methods described throughout the disclosure. In other words, the compositions of the instant disclosure may be free or essentially free of any one or more of the components positively set forth in the instant disclosure for possible inclusion into the compositions.

The term "substantially free" or "essentially free" as used herein means the specific material may be present in small amounts that do not materially affect the basic and novel characteristics of the claimed invention. For instance, there may be less than 1% by weight of a specific material added to a composition, based on the total weight of the compositions (provided that an amount of 1% or less by weight does not materially affect the basic and novel characteristics of the claimed invention). Similarly, when a composition is essentially free from a particular element, the composition may include 1 wt. % or less, 0.5 wt. % or less, 0.1 wt. % or less, 0.05 wt. % or less, 0.01 wt. % or less, or none of the specified material. As an example, if a composition is "substantially free" or "essentially free" from ethanol, the composition may optionally include ethanol in an amount up to 1 wt. %, based on the total weight of the composition, provided an amount of up to 1 wt. % does not materially affect the basic and novel characteristics of the composition. Furthermore, the composition may include 0.5 wt. % or less, 0.1 wt. % or less, 0.05 wt. % or less, 0.01 wt. % or less, or no ethanol.

All publications and patent applications cited throughout the disclosure are incorporated herein by reference in their entirety, and for any and all purposes, as if each individual publication or patent application were specifically and individually indicated to be incorporated by reference. In the event of an inconsistency between the present disclosure and any publications or patent application incorporated herein by reference, the present disclosure controls.

The invention claimed is:

1. A cosmetic composition comprising:
   (a) about 0.05 to about 5 wt. % of 2-mercaptonicotinoyl glycine;
   (b) about 5 to about 25 wt. % of one or more acyl glycinate surfactants;
   (c) about 0.05 to about 5 wt. % of one or more salts providing divalent cations having a charge density of about 40 to about 200 C/mm3 and a water solubility of at least 400 g/L;
   (d) about 0.5 to about 6 wt. % of one or more anionic polymers;
   (e) about 35 to about 60 wt. % of glycerin;
   (f) about 15 to about 50 wt. % of water; and
   (g) about 0.1 to about 3 wt. % of one or more thiosulfate and/or bisulfite reducing agents;
   wherein the composition has a viscosity of about 25,000 cP to about 300,000 cP at 25° C. and a shear rate of 1 s$^{-1}$, and all percentages by weight are based on a total weight of the composition.

2. The composition of claim 1, wherein the one or more acyl glycinate surfactants are selected from sodium cocoyl glycinate, sodium lauroyl glycinate, sodium myristoyl glycinate, potassium lauroyl glycinate, potassium cocoyl glycinate, or a combination thereof.

3. The composition of claim 1, wherein the one or more salts providing divalent cations are selected from magnesium salts, calcium salts, or a combination thereof.

4. The composition of claim 3, wherein the one or more salts providing divalent cations are selected from magnesium chloride, calcium chloride, magnesium sulfate, magnesium thiosulfate, calcium sulfate, calcium thiosulfate, magnesium pyrrolidone carboxylate, calcium pyrrolidone carboxylate, magnesium gluconate, or a combination thereof.

5. The composition of claim 1, wherein the one or more anionic polymers are copolymers of two or more monomers selected from acrylic acid, methacrylic acid, vinyl monomers, and (meth)acrylamide.

6. The composition of claim 1, wherein the one or more anionic polymers comprise or consist of acrylates copolymer.

7. The composition of claim 1, wherein the one or more thiosulfate and/or bisulfite reducing agents are selected from thiosulfate reducing agents.

8. The composition of claim 7, wherein the thiosulfate reducing agents are selected from sodium thiosulfate, potassium thiosulfate, calcium thiosulfate, ammonium thiosulfate, sodium thiosulfite, potassium thiosulfite, and combinations thereof.

9. The composition of claim 1, wherein the one or more thiosulfate and/or bisulfite reducing agents are selected from bisulfite reducing agents.

10. The composition of claim 9, wherein the bisulfite reducing agents are selected from sodium bisulfite, potassium bisulfite, ammonium bisulfite, sodium metabisulfite, potassium metabisulfite, calcium bisulfite, and combinations thereof.

11. The composition of claim 1, wherein the one or more reducing agents is sodium thiosulfate.

12. The composition of claim 1, further comprising one or more nonionic emulsifiers having a Hydrophilic-Lipophilic (HLB) of about 6 or less.

13. The composition of claim 1 having a pH of about 4 to about 7.

14. The composition of claim 1, wherein the composition has a lamellar liquid crystal structure.

15. The composition of claim 1, wherein (c) and (d) are in a weight ratio of about 1.5:1 to about 1:5 ((c):(d)) and/or (e) and (f) are in a weight ratio of about 1:1 to about 1:2 ((e):(f)).

16. The composition of claim 1, wherein the composition retains at least 90 wt. % of the 2-mercaptonicotinoyl glycine after 2 months in storage at 25° C. in a light resistant glass container.

17. A cosmetic composition consisting of:
   (a) about 0.05 to about 5 wt. % of 2-mercaptonicotinoyl glycine;
   (b) about 5 to about 25 wt. % of one or more acyl glycinate surfactants;
   (c) about 0.05 to about 5 wt. % of one or more salts providing divalent cations having a charge density of about 40 to about 200 C/mm3 and a water solubility of at least 400 g/L;
   (d) about 0.5 to about 6 wt. % of acrylates copolymer;
   (e) about 35 to about 60 wt. % of glycerin;
   (f) about 15 to about 50 wt. % of water; and
   (g) about 0.1 to about 3 wt. % of one or more thiosulfate and/or bisulfite reducing agents;
   (h) about 1 to about 10 wt. % of one or more nonionic emulsifiers having a Hydrophilic-Lipophilic (HLB) of about 6 or less;
   (i) one or more skin active agents;
   (j) optionally, one or more humectants selected from glycols having from 2 to about 10 carbon atoms; and
   (k) optionally, about 0.01 to about 5 wt. % of one or more miscellaneous ingredients;
   wherein the composition has a pH of about 4 to about 7,
   the composition has a lamellar liquid crystal structure,
   the composition has a viscosity of about 25,000 cP to about 300,000 cP at 25° C. and a shear rate of $1 \text{ s}^{-1}$, and
   all percentages by weight are based on a total weight of the composition.

18. A method for treating skin comprising applying the composition of claim 1 to the skin.

19. A method for depigmenting skin, brightening skin, treating hyperpigmentation of skin, treating melasmic skin, evening skin tone, or a combination thereof, the method comprising applying an effective amount of the composition of claim 1 to skin in need thereof.

20. The method of claim 18, wherein the composition is applied as a cleanser, as an overnight treatment, or as a face mask, wherein:
   when applied as a cleanser, the composition is mixed with water and applied to skin, gently rubbed on the skin, and rinsed from the skin;
   when applied as an overnight treatment, the composition is applied to skin and allowed to remain on the skin overnight; and
   when applied as a face mask, the composition is applied to skin, allowed to remain on the skin for a period of at least 1 minute before being removed from the skin.

* * * * *